(12) United States Patent
Dewan et al.

(10) Patent No.: US 12,164,650 B2
(45) Date of Patent: Dec. 10, 2024

(54) SYSTEM, METHOD AND APPARATUS FOR TOTAL STORAGE ENCRYPTION

(71) Applicant: Intel Corporation, Santa Clara, CA (US)

(72) Inventors: Prashant Dewan, Portland, OR (US); Baiju Patel, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 167 days.

(21) Appl. No.: 17/482,370

(22) Filed: Sep. 22, 2021

(65) Prior Publication Data

US 2022/0197825 A1 Jun. 23, 2022

Related U.S. Application Data

(63) Continuation of application No. PCT/US2020/066279, filed on Dec. 20, 2020.

(51) Int. Cl.
*G06F 21/60* (2013.01)
*G06F 12/02* (2006.01)
(Continued)

(52) U.S. Cl.
CPC ........ *G06F 21/602* (2013.01); *G06F 12/0238* (2013.01); *G06F 12/1408* (2013.01);
(Continued)

(58) Field of Classification Search
CPC ............... G06F 21/602; G06F 12/0238; G06F 12/1408; G06F 13/28; G06F 15/7807;
(Continued)

(56) References Cited

U.S. PATENT DOCUMENTS 7,287,140 B1 10/2007 Asanovic et al.
8,494,155 B1 7/2013 Poo et al.
(Continued)

FOREIGN PATENT DOCUMENTS

CN 114647858 A 6/2022
CN 115525335 A 12/2022
(Continued)

OTHER PUBLICATIONS

Intel Corporation. Intel® Architecture Memory Encryption Technologies Specification</i>. Ref: #336907-001US. Rev 1.1. Dec. 2017. (Year: 2017).*
(Continued)

*Primary Examiner* — Tae K Kim
(74) *Attorney, Agent, or Firm* — Spectrum IP Law Group LLC

(57) ABSTRACT

The disclosed embodiments are generally directed to inline encryption of data at line speed at a chip interposed between two memory components. The inline encryption may be implemented at a System-on-Chip ("SOC" or "SOC"). The memory components may comprise Non-Volatile Memory express (NVMe) and a dynamic random access memory (DRAM). An exemplary device includes an SOC to communicate with a Non-Volatile Memory NVMe circuitry to provide direct memory access (DMA) to an external memory component. The SOC may include: a cryptographic controller circuitry; a cryptographic memory circuitry in communication with the cryptographic controller, the cryptographic memory circuitry configured to store instructions to encrypt or decrypt data transmitted through the SOC; and an encryption engine in communication with the crypto controller circuitry, the encryption engine configured to encrypt or decrypt data according to instructions stored at
(Continued)

the crypto memory circuitry. Other embodiments are also disclosed and claimed.

20 Claims, 17 Drawing Sheets

(51) Int. Cl.
*G06F 12/14* (2006.01)
*G06F 13/28* (2006.01)
*G06F 15/78* (2006.01)
*G06F 21/10* (2013.01)
*G06F 21/62* (2013.01)
*G06F 21/79* (2013.01)

(52) U.S. Cl.
CPC .......... *G06F 13/28* (2013.01); *G06F 15/7807* (2013.01); *G06F 21/6209* (2013.01); *G06F 21/79* (2013.01); *G06F 21/107* (2023.08); *G06F 2212/1052* (2013.01); *G06F 2212/222* (2013.01)

(58) Field of Classification Search
CPC .... G06F 21/6209; G06F 21/79; G06F 21/107; G06F 2212/1052; G06F 2212/222
USPC .......................................................... 713/193
See application file for complete search history.

(56) References Cited

U.S. PATENT DOCUMENTS

| | | | |
|---|---|---|---|
| 8,516,269 B1 | 8/2013 | Hamlet et al. | |
| 8,819,685 B2 | 8/2014 | Zhang et al. | |
| 8,850,225 B2 | 9/2014 | Noehring et al. | |
| 8,954,788 B2 | 2/2015 | Abraham et al. | |
| 9,064,135 B1 | 6/2015 | Poo et al. | |
| 9,251,380 B1* | 2/2016 | Au | G06F 21/72 |
| 9,584,329 B1 | 2/2017 | Trimberger | |
| 9,798,900 B2 | 10/2017 | Oh et al. | |
| 9,892,265 B1 | 2/2018 | Tripathy et al. | |
| 10,078,754 B1 | 9/2018 | Brandwine et al. | |
| 10,193,701 B2 | 1/2019 | Kim et al. | |
| 10,521,618 B1 | 12/2019 | Zhang et al. | |
| 10,742,421 B1 | 8/2020 | Wentz et al. | |
| 10,896,267 B2 | 1/2021 | Ndu et al. | |
| 11,205,003 B2 | 12/2021 | Patel et al. | |
| 11,321,459 B2 | 5/2022 | Shen et al. | |
| 11,720,672 B2 | 8/2023 | Shen | |
| 2002/0129246 A1 | 9/2002 | Blumenau et al. | |
| 2004/0158711 A1 | 8/2004 | Zimmer | |
| 2005/0021986 A1 | 1/2005 | Graunke et al. | |
| 2005/0108532 A1 | 5/2005 | Bajikar | |
| 2005/0232415 A1 | 10/2005 | Little et al. | |
| 2006/0181942 A1 | 8/2006 | Cordero et al. | |
| 2006/0193470 A1* | 8/2006 | Williams | H04L 9/0894 380/259 |
| 2007/0180239 A1 | 8/2007 | Fujibayashi et al. | |
| 2008/0002590 A1 | 1/2008 | Thomas et al. | |
| 2008/0005706 A1 | 1/2008 | Sharma et al. | |
| 2008/0063197 A1 | 3/2008 | Jaquette et al. | |
| 2008/0065882 A1 | 3/2008 | Goodman et al. | |
| 2008/0222383 A1 | 9/2008 | Spracklen et al. | |
| 2010/0005375 A1 | 1/2010 | Dell et al. | |
| 2010/0023739 A1 | 1/2010 | Levit-Gurevich et al. | |
| 2010/0054466 A1 | 3/2010 | Kerins et al. | |
| 2011/0002461 A1 | 1/2011 | Erhart et al. | |
| 2011/0060915 A1 | 3/2011 | Tal | |
| 2011/0066837 A1 | 3/2011 | Lee et al. | |
| 2011/0149737 A1 | 6/2011 | Muthiah et al. | |
| 2011/0320921 A1 | 12/2011 | Gower et al. | |
| 2012/0030669 A1 | 2/2012 | Tsirkin | |
| 2012/0054455 A1 | 3/2012 | Wang et al. | |
| 2012/0072737 A1 | 3/2012 | Schrijen et al. | |
| 2012/0084674 A1* | 4/2012 | Visosky | G06F 3/04817 715/761 |
| 2012/0144205 A1 | 6/2012 | Shu et al. | |
| 2012/0151224 A1 | 6/2012 | Koifman et al. | |
| 2012/0151247 A1 | 6/2012 | Ferraiolo et al. | |
| 2012/0254862 A1 | 10/2012 | Dong | |
| 2013/0013934 A1* | 1/2013 | King | G06F 21/00 713/190 |
| 2013/0152099 A1 | 6/2013 | Bass et al. | |
| 2014/0022976 A1 | 1/2014 | Chao et al. | |
| 2014/0079220 A1 | 3/2014 | Wei et al. | |
| 2014/0089658 A1 | 3/2014 | Raghuram et al. | |
| 2014/0093074 A1 | 4/2014 | Gotze et al. | |
| 2014/0122902 A1 | 5/2014 | Isozaki et al. | |
| 2014/0133845 A1 | 5/2014 | Dahlfort et al. | |
| 2014/0136680 A1 | 5/2014 | Joshi et al. | |
| 2014/0258716 A1 | 9/2014 | MacMillan et al. | |
| 2014/0270177 A1 | 9/2014 | Brickell et al. | |
| 2014/0359182 A1 | 12/2014 | Georgiev | |
| 2015/0288526 A1 | 10/2015 | Mclean et al. | |
| 2016/0019396 A1 | 1/2016 | Davis et al. | |
| 2016/0139982 A1 | 7/2016 | Yu et al. | |
| 2016/0246967 A1 | 8/2016 | Gross et al. | |
| 2016/0323096 A1 | 11/2016 | Kara-Ivanov et al. | |
| 2017/0022494 A1 | 1/2017 | Hill et al. | |
| 2017/0026171 A1* | 1/2017 | Lal | H04L 9/0822 |
| 2017/0090815 A1 | 3/2017 | Kelner et al. | |
| 2017/0091489 A1* | 3/2017 | Dragone | G06F 21/6218 |
| 2017/0149572 A1 | 5/2017 | Wallrabenstein | |
| 2017/0220494 A1* | 8/2017 | Shacham | G06F 21/85 |
| 2018/0088978 A1 | 3/2018 | Li et al. | |
| 2018/0095750 A1 | 4/2018 | Drysdale et al. | |
| 2018/0107608 A1 | 4/2018 | Kaplan et al. | |
| 2018/0189104 A1 | 7/2018 | Agarwal et al. | |
| 2018/0204007 A1 | 7/2018 | Rangayyan | |
| 2019/0004973 A1 | 1/2019 | Chhabra et al. | |
| 2019/0042474 A1* | 2/2019 | Edirisooriya | G06F 3/0634 |
| 2019/0075183 A1 | 3/2019 | Silberkasten et al. | |
| 2019/0097818 A1 | 3/2019 | Lu et al. | |
| 2019/0102293 A1* | 4/2019 | Li | G06F 3/0688 |
| 2019/0102568 A1 | 4/2019 | Hausauer et al. | |
| 2019/0102577 A1* | 4/2019 | Gueron | G06F 21/79 |
| 2019/0116052 A1 | 4/2019 | Kim et al. | |
| 2019/0130103 A1 | 5/2019 | Shen et al. | |
| 2019/0149478 A1 | 5/2019 | Mchugh et al. | |
| 2019/0165956 A1 | 5/2019 | Adham et al. | |
| 2019/0165957 A1 | 5/2019 | Abbott et al. | |
| 2019/0227827 A1 | 7/2019 | Zmudzinski et al. | |
| 2019/0281025 A1 | 9/2019 | Harriman et al. | |
| 2019/0311123 A1 | 10/2019 | Lal et al. | |
| 2019/0324725 A1 | 10/2019 | Wang | |
| 2019/0342093 A1 | 11/2019 | Chhabra et al. | |
| 2019/0361807 A1 | 11/2019 | Desai et al. | |
| 2020/0013451 A1* | 1/2020 | Son | G11C 7/1048 |
| 2020/0034549 A1 | 1/2020 | Lu | |
| 2020/0052892 A1 | 2/2020 | Chhabra et al. | |
| 2020/0099658 A1 | 3/2020 | Couillard et al. | |
| 2020/0110888 A1 | 4/2020 | Kim et al. | |
| 2020/0134208 A1 | 4/2020 | Pappachan et al. | |
| 2020/0143067 A1* | 5/2020 | Alemzadeh | G06F 21/79 |
| 2020/0159969 A1 | 5/2020 | Shanbhogue et al. | |
| 2020/0175646 A1 | 6/2020 | Boyd et al. | |
| 2020/0226263 A1 | 7/2020 | Patel et al. | |
| 2020/0266995 A1 | 8/2020 | Gopal | |
| 2020/0285492 A1 | 9/2020 | Mihajlovski et al. | |
| 2020/0319913 A1 | 10/2020 | Kumar et al. | |
| 2020/0342117 A1 | 10/2020 | Richards et al. | |
| 2021/0004338 A1 | 1/2021 | Marolia et al. | |
| 2021/0149728 A1 | 5/2021 | Wood et al. | |
| 2021/0157935 A1 | 5/2021 | Sood et al. | |
| 2021/0224202 A1 | 7/2021 | Chhabra et al. | |
| 2021/0232694 A1 | 7/2021 | Jannyavula et al. | |
| 2021/0318966 A1 | 10/2021 | Chhabra et al. | |
| 2021/0319138 A1 | 10/2021 | Dewan et al. | |
| 2021/0342182 A1 | 11/2021 | Kumar et al. | |
| 2021/0382836 A1 | 12/2021 | Lantz et al. | |
| 2022/0035749 A1 | 2/2022 | Chhabra et al. | |
| 2022/0100687 A1 | 3/2022 | Sahin et al. | |
| 2022/0182232 A1 | 6/2022 | Marson et al. | |
| 2022/0197825 A1 | 6/2022 | Dewan et al. | |
| 2022/0198027 A1 | 6/2022 | Chhabra et al. | |

(56) References Cited

U.S. PATENT DOCUMENTS

| | | |
|---|---|---|
| 2022/0209966 A1 | 6/2022 | Chhabra et al. |
| 2022/0209967 A1 | 6/2022 | Chhabra et al. |
| 2022/0209968 A1 | 6/2022 | Chhabra et al. |
| 2022/0209969 A1 | 6/2022 | Chhabra et al. |
| 2022/0318144 A1 | 10/2022 | Bajic et al. |
| 2022/0350503 A1 | 11/2022 | Tkacik et al. |
| 2023/0032236 A1 | 2/2023 | Sankaran et al. |
| 2023/0102178 A1 | 3/2023 | Chhabra et al. |
| 2024/0004990 A1 | 1/2024 | Kakaiya |

FOREIGN PATENT DOCUMENTS

| | | |
|---|---|---|
| CN | 115686740 A | 2/2023 |
| CN | 117083612 A | 11/2023 |
| DE | 102022112551 A1 | 12/2022 |
| EP | 3547130 A1 | 10/2019 |
| EP | 3757849 A1 | 12/2020 |
| EP | 3757853 A1 | 12/2020 |
| EP | 4016358 A1 | 6/2022 |
| EP | 4124965 A1 | 2/2023 |
| EP | 4152167 A1 | 3/2023 |
| EP | 4242893 A2 | 9/2023 |
| EP | 3726392 A1 | 10/2023 |
| EP | 4322006 A1 | 2/2024 |
| GB | 2578135 A | 4/2020 |
| JP | 2021064378 A | 10/2022 |
| NL | 2029658 A | 7/2022 |
| WO | 2011160957 A1 | 12/2011 |
| WO | 2019066918 A1 | 4/2019 |
| WO | 2021035517 A1 | 3/2021 |
| WO | 2021080732 A1 | 4/2021 |
| WO | 2021162792 A1 | 8/2021 |
| WO | 2022132184 A1 | 6/2022 |
| WO | 2023009641 A1 | 2/2023 |
| WO | 2023113918 A1 | 6/2023 |

OTHER PUBLICATIONS

U.S. Appl. No. 17/551,166, filed Dec. 14, 2021, Saurabh Gayen.
U.S. Appl. No. 17/711,928, filed Apr. 1, 2022, Narayan Ranganathan.
U.S. Appl. No. 17/854,159, filed Jun. 30, 2022, Utkarsh Y. Kakaiya.
U.S. Appl. No. 17/854,322, filed Jun. 30, 2022, Utkarsh Y. Kakaiya.
U.S. Appl. No. 17/875,198, filed Jul. 27, 2022, Rajesh M. Sankaran.
International Search Report for application No. PCT/US2022/047184, issued Feb. 15, 2023, 3 pages.
Written Opinion for application No. PCT/US2022/047184, issued Feb. 15, 2023, 6 pages.
International Search Report and Written Opinion issued on Jun. 24, 2022 for PCT/US2022/021446.
European Search Report, Application No. EP22181090, issued Dec. 7, 2022, 7 pages.
U.S. Appl. No. 17/478,828, filed Sep. 17, 2021, Anand K. Enamandram.
GDSII, retrieved from https://en.wikipedia.org/w/index.php?title=GDSII&oldid=1003588402 on Jun. 15, 2021.
Extended European Search Report issued on Feb. 28, 2022 for EP Application No. 21198475.2.
Notice of Allowance issued on Aug. 30, 2021 for U.S. Appl. No. 16/832,138.
Intel® Architecture Memory Encryption Technologies Specification, Revision 1.3, Apr. 2021.
Samsung Unveils Industry—First Memory Module Incorporating New CXL interconnect Standard, May 11, 2021, downloaded Jun. 13, 2021, from https://news.samsung.com, 5 pages.
U.S. Appl. No. 17/357,973, filed Jun. 24, 2021, Prashant Dewan.
U.S. Appl. No. 17/358,238, filed Jun. 25, 2021, Siddhartha Chhabra.
International Search Report and Written Opinion issued by KIPO on Oct. 28, 2021 for corresponding PCT/US2020/066279, 18 pages.
Smart Data Accelerator Interface ("SDXI") Specification, Version 1.0, SNIA, Nov. 28, 2022, 144 pages.
Partial European Search Report for application No. 23156058.2, issued Jul. 26, 2023, 14 pages.
Wikipedia, "Disk encryption theory," downloaded from "https://en.wikipedia.org/wiki/Disk_encryption_theory#XTS" on Jul. 25, 2023, 7 pages.
European Search Report for application No. 22188217.8-1203, issued Feb. 3, 2023, 16 pages.
Extended European Search Report for application No. 22188217.8, issued May 8, 2023, 13 pages.
Notice of Grant of NL application No. 2029658, Dutch Patent No. 2029658, issued Jun. 13, 2023, 6 pages.
International Search Report for International application No. PCT/US2022/038546, mailed Nov. 18, 2022, 4 pages.
Written Opinion of the International Searching Authority for International application No. PCT/US2022/038546, mailed Nov. 18, 2022, 5 pages.
Extended European Search Report for Application No. 22188184.0-1224, issued Jan. 25, 2023, 8 pages.
Search report issued by the Dutch patent office per EPO report (application 2029658), dated Mar. 22, 2023, 11 pages (with machine translation of cover letter).
J. Zhu et al., "Enabling Rack-scale Confidential Computing using Heterogeneous Trusted Execution Environment," 2020 IEEE Symposium on Security and Privacy (SP), 2020, pp. 1450-1465.
V. Krishnan, O. Serres and M. Blocksome, "COnfigurable Network Protocol Accelerator (COPA): An Integrated Networking/Accelerator Hardware/Software Framework," 2020 IEEE Symposium on High-Performance Interconnects (HOTI), 2020, pp. 17-24.
IONOS, Hyperscale Computing—load balancing for large quantities of data, Aug. 24, 2020, downloaded Sep. 2, 2021, 8 pages.
Jack Keil Wolf, an introduction to error correcting codes, Part 1, ECE 154C, Spring 2008, 146 pages.
"Intel Data Streaming Accelerator Architecture Specification," Revision 1.2, 197 pages, Sep. 2021.
"Intel® QuickAssist Technology (Intel® QAT)—Data Center Performance," downloaded Jun. 12, 2022, from "https://www.intel.com/content/www/us/en/architecture-and-technology/intel-quick-assist-technology-overview.html," 6 pages.
"Smart Data Accelerator Interface ("SDXI") Specification," Version 0.9.0 rev 1, SNIA Advancing Storage & Information Technology, 109 pages.
IBM Cloud Education, "What is Multi-Tenant?" IBM Cloud Learn Hub, retrieved on Dec. 2, 2021 from https://www.ibm.com/cloud/learn/multi-tenant.
Iyer, Shyamkumar, "Introducing Smart Data Acceleration Interface (SDXI)," In-Memory Computing Summit (Oct. 28, 2020).
Jiang, David, "Introducing the Intel Data Streaming Accelerator (Intel DSA)," retrieved on Dec. 1, 2021 from https://01.org/blogs/2019/introducing-intel-data-streaming-accelerator.
International Search Report and Written Opinion issued on Jun. 30, 2022 for PCT/US2022/021531.
Gunlu, Onur, et al. "Secure and Reliable Key Agreement with Physical Unclonable Functions," Entropy 2018, vol. 20, May 3, 2018, pp. 1-19.
Intel Architecture Memory Encryption Technologies, Document No. 336907-003US, Apr. 2021.
International Preliminary Report on Patentability for application No. PCT/US2020/066279, issued Jun. 13, 2023, 11 pages.
C. Priebe, K. Vaswani and M. Costa, "EnclaveDB: A Secure Database Using SGX," 2018 IEEE Symposium on Security and Privacy (SP), San Francisco, CA, USA, 2018, pp. 264-278.
European Search Report for application No. 23156058.2, issued Oct. 26, 2023, 13 pages.
J. Won, A. Singla, E. Bertino and G. Bollella, "Decentralized Public Key Infrastructure for Internet-of-Things," MILCOM 2018—2018 IEEE Military Communications Conference (MILCOM), Los Angeles, CA, USA, 2018, pp. 907-913.
M. Werner, T. Unterluggauer, R. Schilling, D. Schaffenrath and S. Mangard, "Transparent memory encryption and authentication," 2017 27th International Conference on Field Programmable Logic and Applications (FPL), Ghent, Belgium, 2017, pp. 1-6.
Unterluggauer T, Werner M, Mangard S. Meas: memory encryption and authentication secure against side-channel attacks. J Cryptogr Eng. 2019;9(2):137-158. doi: 10.1007/s13389-018-0180-2. Epub Jan. 25, 2018. PMID: 31231603; PMCID: PMC6555441.

(56) References Cited

OTHER PUBLICATIONS

"Intel Data Streaming Accelerator Preliminary Architecture Specification," retrieved from https://software.intel.com/sites/default/files/341204-intel-data-streaming-accelerator-spec-pdf on May 6, 2020, revision 1.0, Nov. 2019, 125 pages.
European Examination Report for app. No. 21198475.2, issued Jan. 4, 2024, 5 pages.
Extended European search report for application No. 23191363.3, issued Nov. 30, 2023, 11 pages.
International Preliminary Report on Patentability and Written Opinion (International app. No. PCT/US2022/021446), issued Dec. 14, 2023, 5 pages.
International Preliminary Report on Patentability and written opinion (international application No. PCT/US2022/021531), issued Dec. 14, 2023, 5 pages.
Intel Data Streaming Accelerator Architecture Specification, Revision 2.0, Sep. 2022, 253 pages.
Intel Scalable I/O Virtualization, Technical Specification, Rev. 1.1, Sep. 2020, 29 pages.
Intel TDX Connect Architecture Specification, Mar. 2023, 40 pages.
Zhao et al., "Contiguitas: The Pursuit of Physical Memory Contiguity in Datacenters," Jun. 2023, 15 pages.
Advanced Micro Devices, "Tiered Memory Page Migration Operations Guide," publication # 58151, Revision 0.51, May 2023, 33 pages.
Final Office Action issued in U.S. Appl. No. 17/358,284 on Feb. 22, 2024, 22 pages.
Non-final Office Action issued in U.S. Appl. No. 17/133,627, on Feb. 15, 2024, 23 pages.

\* cited by examiner

*(Read from Memory, Write to Device Request)*

(Read from Device, Write to Memory Request)

(Decryption)

*(Encryption)*

| Bits | Field | Description |
|---|---|---|
| 15:0 | KLT Index | Key Lookup Table Index (16 bits) |
| 23:16 | MBZ | Must be Zero |
| 28:24 | Type | $1E_0E_1E_2E_3$ |
| 31:29 | Format | 100b |
| 47:32 | Offset | Logical Block Address Offset (16 bits) |
| 55:48 | MBZ | Must be Zero |
| 60:56 | Type | $1E_0E_1E_2E_3$ |
| 63:61 | Format | 100b |
| 127:64 | TLP Header and Data | This contains the TLP header and the data (optional). The TLP is a memory read/write TLP. |

FIG. 12

SYSTEM, METHOD AND APPARATUS FOR TOTAL STORAGE ENCRYPTION

FIELD

The instant disclosure generally relates to system, method and apparatus for total storage encryption. In one embodiment, the disclosure provides method, system and apparatus for inline encryption mechanism for data stored on non-volatile memory devices.

BACKGROUND

A system on chip (SOC) is an integrated circuit that integrates all components of a computer or other electronic system. These components include a central processing unit (CPU), memory, input/output (IO) ports and secondary storage, which are all included on a single substrate or microchip. Additionally, SOCs enable the integration of third part components via a standardized on-die interconnect protocol. Such third part components may include non-volatile memory (NVM). There is a need to protect data stored at the NVM (e.g., data at rest).

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 12 illustrates information regarding various fields of the TLP of FIG. 11, according to an embodiment;

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware (such as logic circuitry or more generally circuitry or circuit), software, firmware, or sonic combination thereof.

NVMe (Non-Volatile Memory express) devices store data at rest (i.e., persistently) and this data has to be encrypted for security. In order to perform encryption in the System on Chip ("SOC"), the cryptographic (also referred to herein as "crypto" interchangeably) controller responsible for encryption in the SOC needs multiple pieces of information regarding the NVMe device including the LBA (Logical Block Address) of the NVMe device where the data is being stored. While some embodiments herein are discussed with reference to an NVMe, embodiments are not limited to NVMe and other types of non-volatile memory may be used.

In various implementations, the information regarding the NVMe device may not be communicated to the host (or interchangeably referred to herein as "host driver") or the crypto controller in the DMA (Direct Memory Access) path. In other words, when the drive performs a DMA operation, it may not send this information to the host. Most NVMe drives used in personal computers have to use the PCIe (Peripheral Component Interface express (e.g., as maintained and developed by the PCI-SIG (PCI Special Interest Group)) protocol), and the PCIe protocol headers do not provide any mechanism for the drive to send additional information. This makes the problem of inline encryption using NVMe drives very tricky. As discussed herein, inline encryption implies that the encryption and decryption are happening when the data is being read/written from the drive to DRAM or vice-versa. This is in contrast to lookaside encryption, where the NVMe controller writes data to memory and then some other agent reads plaintext data from memory, encrypts it and writes it back to memory or reads ciphertext from memory, decrypts it and writes plaintext to memory. As a result, the drive may not provide the information for encryption.

Figure 1:
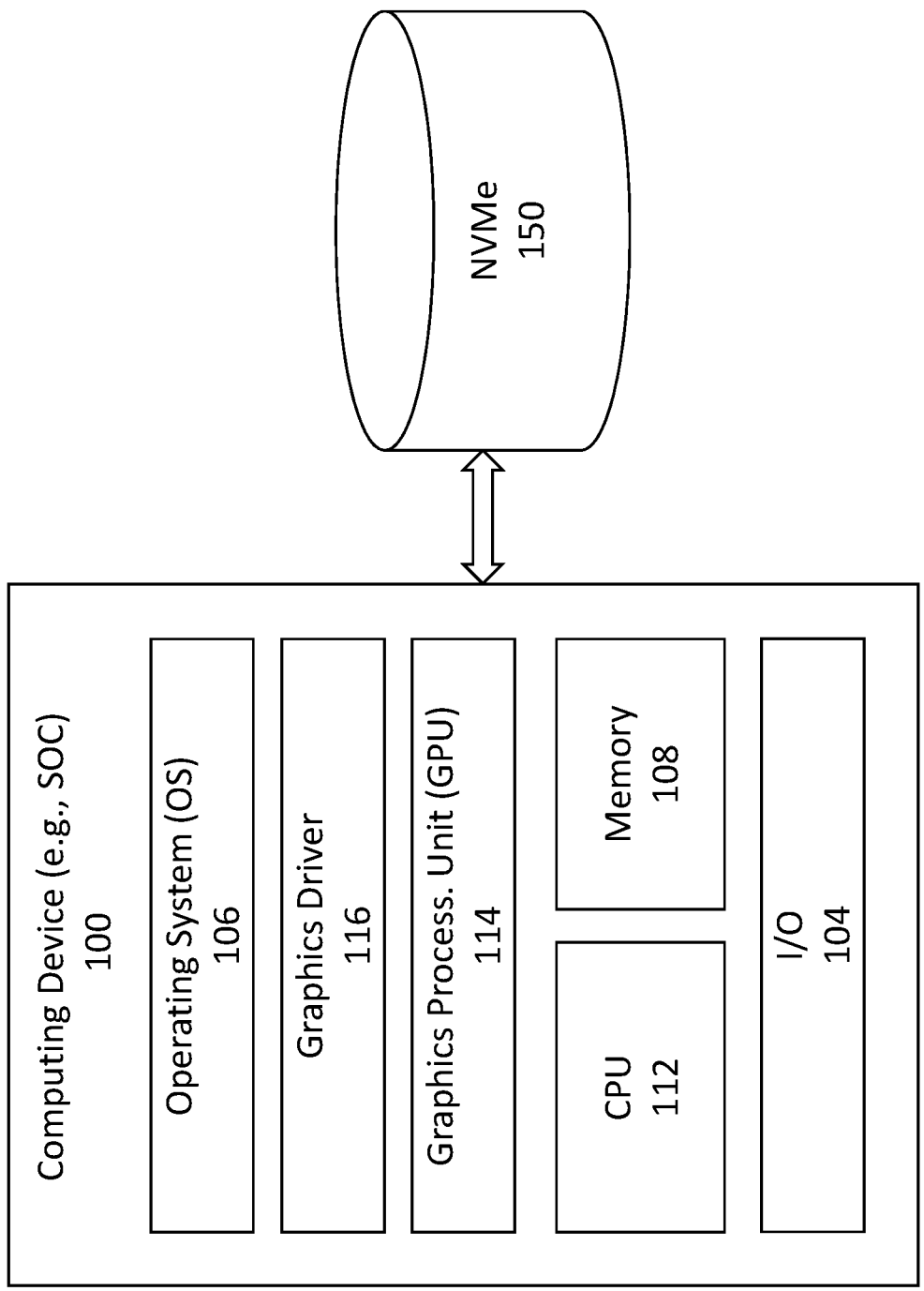
FIG. 1 schematically illustrates an exemplary embodiment of a computing device for implementing a disclosed embodiment.

FIG. 1 schematically illustrates an exemplary embodiment of a computing device for implementing a disclosed embodiment. In FIG. 1, computing device 100 comprises a computer platform hosting an integrated circuit ("IC"), such as a SOC, integrating various hardware and/or software components of computing device 100 on a single chip. As illustrated, in one embodiment, computing device 100 may include any number and type of hardware and/or software components, such as (without limitation) graphics processing unit 114 ("GPU" or simply "graphics processor"), graphics driver 116 (also referred to as "GPU driver", "graphics driver logic", "driver logic", user-mode driver (UMD), UMD, user-mode driver framework (UMDF), UMDF, or simply "driver"), central processing unit 112 ("CPU" or simply "application processor"), memory 108, network devices, drivers, or the like, as well as input/output (I/O) sources 104, such as touchscreens, touch panels, touch pads, virtual or regular keyboards, virtual or regular mice, ports, connectors, etc. Computing device 100 may include operating system (OS) 106 serving as an interface between hardware and/or physical resources of computing device 100 and a user. SOC 100 may optionally communicate with NVM 150. Non-volatile memory 150 may be accessed using non-volatile memory express which is the protocol for accessing high-speed storage media. NVMe is used herein to reference both the non-volatile memory (e.g., SSD) and its communication protocol.

It should be noted that FIG. 1 illustrates an exemplary embodiment and additional components may be included without departing from the disclosed principles. For example, embodiments may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or a combination thereof, such as firmware. Additional embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

Figure 2:
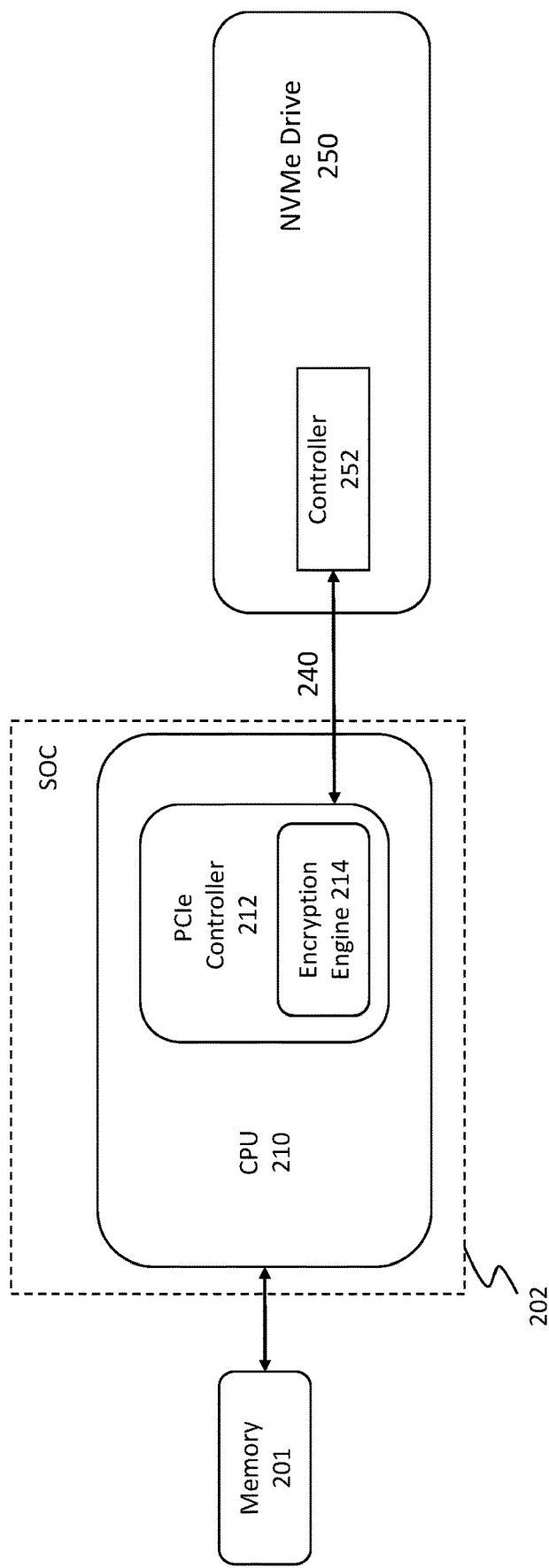
FIG. 2 schematically illustrates an exemplary system topology according to an embodiment of the disclosure.

FIG. 2 schematically illustrates an exemplary system topology according to an embodiment of the disclosure. CPU 210 of FIG. 2 includes PCIe controller 212 which in turn comprises encryption engine 214. PCIe controller 212 conventionally defines an interface standard for connecting high-speed components such as NVMe. As shown, PCIe controller 212 includes encryption engine 214 for encrypting/decrypting inbound and outbound communications. CPU 210 communicates with peripheral component (i.e., NVMe drive 250) through PCIe controller 212. NVMe controller 252 acts as the portal to NVMe driver and may include additional components (not shown) to encrypt/decrypt the inbound/outbound communications. Communications between CPU 210 and NVMe 250 are considered inline communications.

Inline encryption for NVMe drives raises a challenge which is unique to the NVMe drivers. In the exemplary embodiment of FIG. 2, the challenge is that NVMe drive 250 includes NVMe controller 252 in the driver itself. As a result, inline encryption engine 214 in the SOC 202 lacks the required metadata to decide which of the packets must be encrypted/decrypted and the key/tweak material required for their encryption.

Conventional storage device encryption methodologies include AES-XTS standards which use a tweak. In such methodologies, the tweak is generated using Logical Block Address (LBA) and the challenge is that the host does not receive the block address from the drive in the direct memory access (DMA) path. The LBA is managed by the drive internally. A second challenge is that the commands that go to the drive cannot be encrypted since they must be parsed and executed by the drive. As a result, the inline encryption in SOC (i.e., encryption engine 214) needs a mechanism to parse the packets and figure out which ones are data packets and which ones are command packages.

In one embodiment, this deficiency is addressed by generating one or more command streams by NVMe drive (interchangeably, the "driver"). The command streams comprise LBA-to-Physical Address mapping. The driver that is generating the command steam may also generate a table for optimized lookup during the DMA transaction. The table may comprise of the block addresses to be used in the tweak generation, the index of the key and other parameters. In one embodiment, the software generates the tweak table using the tweak table interface of the Crypto Controller. The tweak table may be updated per transaction. An inline cryptographic controller (having processor and memory circuitries) that resides in the SOC can look up the table at line speeds to obtain the data needed as an input to the encryption/decryption engine. This enables the inline crypto controller to perform the encryption between the NVMe drive (the driver) and the memory at line speeds, for example, according to the PCIe, Gen. 5, standards.

Figure 3A:
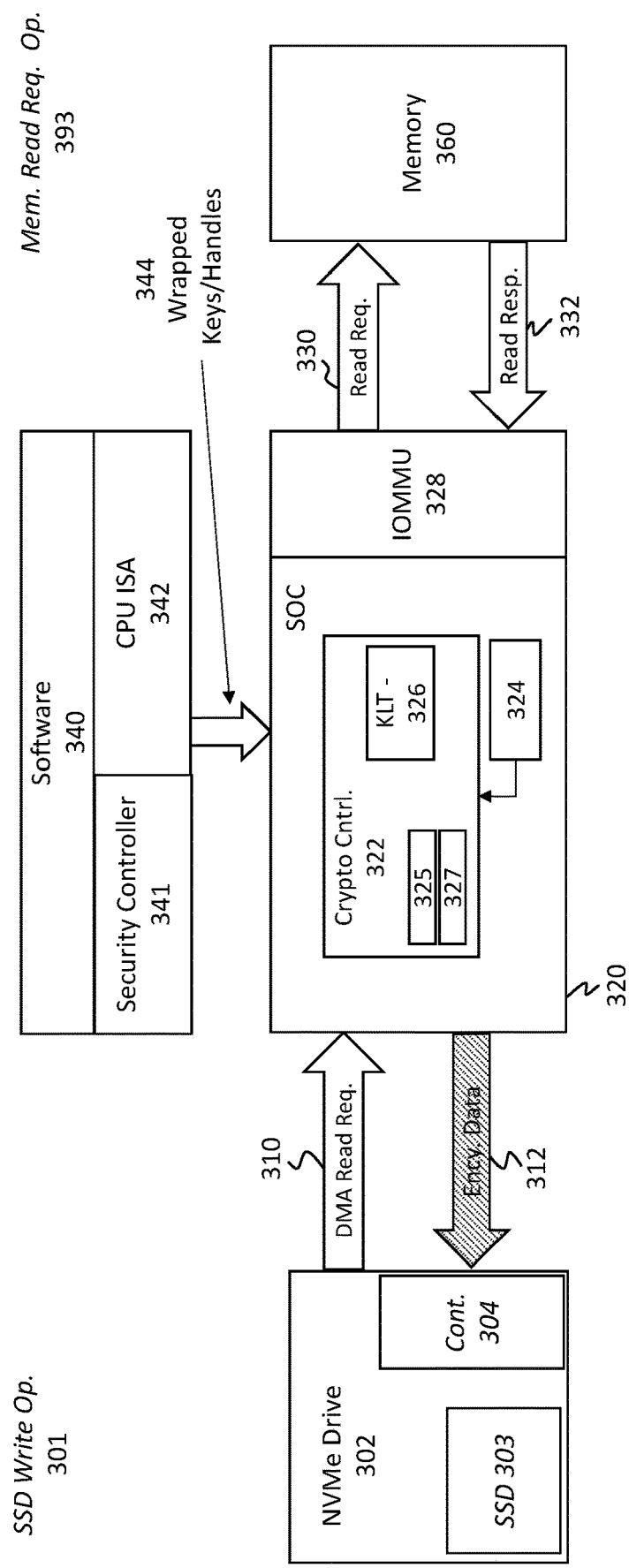
FIG. 3A illustrates a system architecture for a memory read process at line speed.
Figure 3B:
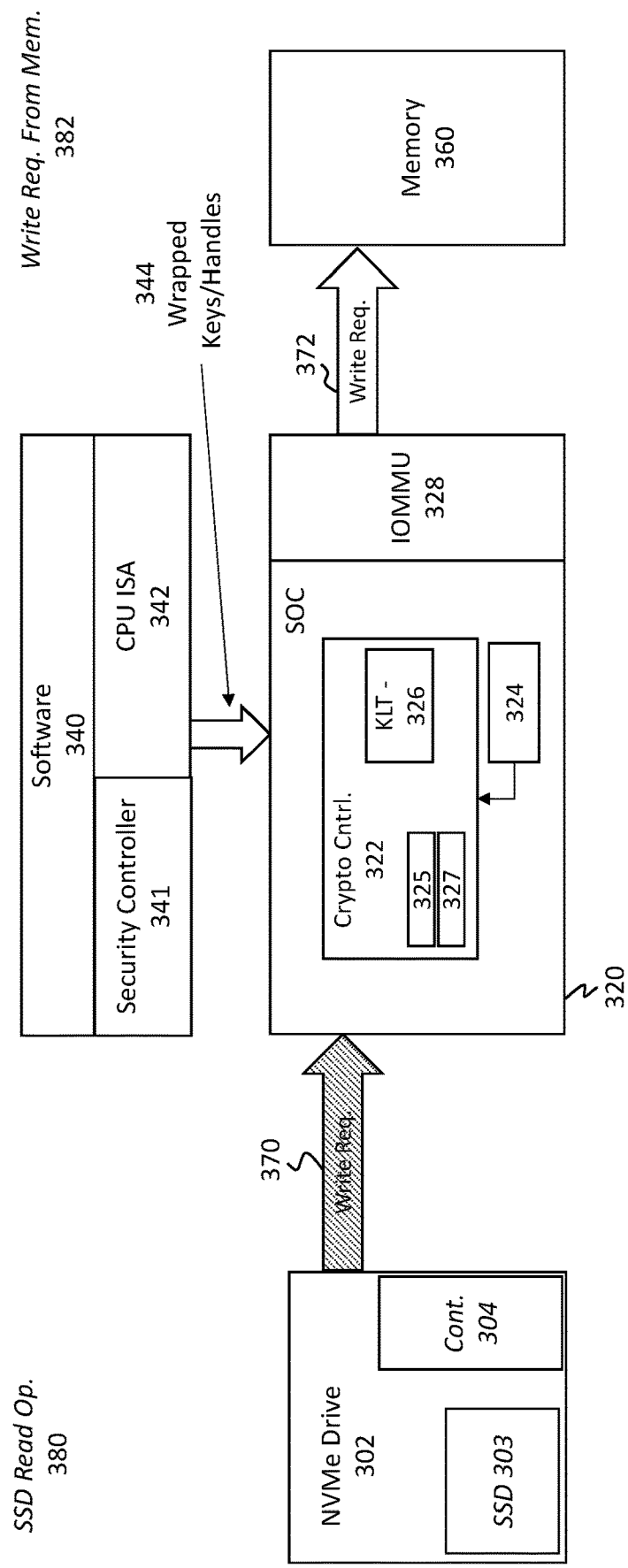
FIG. 3B illustrates a system architecture for a memory write process at line speed.

Thus, an embodiment of the disclosure is directed to an inline cryptographic controller which is integrated with an SOC and is placed in the DMA path of the NVMe Drive. The encryption and decryption of data is implemented inside the SOC. FIGS. 3A and 3B illustrate system architecture for memory access at line speeds according to an embodiment of the disclosure.

Specifically, FIG. 3A illustrates a system architecture for a memory read process at line speed as used to read from memory 360 and write to device 302. Referring to FIG. 3A, NVMe drive 302 may correspond to NVMe drive 150 or 250 in FIGS. 1 and 2. In one example, the NVMe drive 302 comprises a solid state drive (SSD) which is transacting a write operation 301 on memory 360 as denoted by memory read operation 393. Memory 360 may correspond to memory 108 or 201 in FIGS. 1 and 2. Memory 360 may for example comprise a Dynamic Random Access Memory (DRAM).

Conventional SSDs read and write data to a substrate of interconnected flash memory chips which are fabricated in silicon. NVMe SSDs have been gaining popularity due to their speed. NVMe SSDs use NVMe Host Controller Host Controller Interface Specification (NVMHCIS) (not shown) for accessing non-volatile storage media attached via PCIe bus network (not shown).

Referring again to FIG. 3A, NVMe drive 302 may require direct memory access (DMA) to memory 360 in order to obtain data. To this end, NVMe drive 302 issues DMA Read Request 310 to SOC 320. The SOC 320 may correspond to computing device/SOC 100 or SOC 202 in FIGS. 1 and 2. The DMA Read Request 310 need not be encrypted.

SOC 320 is interposed between NVMe drive 302 and memory 360. Memory 360 may comprise a Dynamic Random Access Memory (DRAM). SOC 320 is shown with Cryptographic Controller (Crypto Controller) 322, hardware key engine 324 and Input/Output Memory Management Unit (IOMMU) 328. Hardware key engine receives its keys from the CPU ISA 340 (as programmed by software) or from a security controller.

Crypto Controller 322 may comprise one or more processor circuitries and components. In one embodiment, Crypto Controller 322 is implemented in a PCIe controller 212 of the SOC 320. For example, the Crypto Controller 322 could implement or be part of the encryption engine 214 shown in FIG. 2. In one embodiment, Crypto Controller 322 comprises encryption/decryption engine 325 configured to encrypt or decrypt data according to instructions stored at the crypto memory circuitry and/or lookup tables. Crypto Controller 322 may optionally also comprise Key Lookup Table (KLT) 326. KLT 326 is a memory circuitry used to store various lookup tables as further described below.

Crypto Controller 322 may optionally include memory 327. Memory 327 may comprise one or more Static Random Access Memory (SRAM) circuitries in communication with processor circuitries of Crypto Controller 322. Memory circuitry 327 may store one or more instructions to cause the one or more processor circuitries (not shown) in Crypto Controller 322 to execute a plurality of desired tasks. The tasks include, for example, receipt and storing of cryptographic information required to encrypt or decrypt data, forming data and/or key tables and communicating encrypted or decrypted data with components external to the SOC 320. Once formed, such tables may be stored at Key Lookup Table (KLT) 326. In one embodiment, the Crypto Memory Circuitry 327 may include KLT 326. In another embodiment the KLT 326 may be in DRAM 360 and the memory 327 inside the crypto controller may serve as a cache.

For simplicity, the following exemplary embodiments reference Crypto Controller 322 generically to include encryption/decryption engine 325 and Memory 327, where applicable.

Crypto controller 322 also includes Input/Output Memory Management Unit (IOMMU) 328 which connects a DMA-capable I/O bus to external Memory 360. In one embodiment, the IOMMU will be inside the SOC 320 but not inside the crypto controller 322. The crypto controller will be between the IOMMU and the memory 360.

Software 340 interfaces SOC 320 via CPU Instruction Set Architecture (ISA) 342. ISA 342 acts as an interface between Software 340 and SOC 320. In one embodiment, Software 340 supports multiple encryption keys. Software 340 may program the Keys. There may be four types of keys: (1) hardware generated, (2) hardware wrapped, (3) plaintext keys, and (4) no-encryption "key". Security controller 341 is shown as part of Software 340 to comprise one or more processors (circuitry or logical) to implement functions ascribed to Software 340.

In another embodiment, Software 340 may utilize Key Wrap construction 344. The Key Wrap constructions are a class of symmetric encryption algorithms designed to encapsulate (encrypt) cryptographic key material. The Key Wrap algorithm is intended to protect keys while stored in an untrusted storage or when the keys are transmitted over untrusted communications networks. Here, the Key Wrap/Handle construction may be optionally used as the communication is external to SOC 320.

During an exemplary implementation NVMe driver (e.g., SSD) 302 transmits a read request 310 to SOC 320. Read Request 310 may not be encrypted. In an optional embodiment, a portion of the Read Request 310 may be encrypted. Read Request 310 contains a key table index (or key lookup index) and optionally further an offset to the LBA which allow the Crypto Controller 322 identifying one or more encryption of the requested data. When using a PCIe link between the NVMe drive 302 and the SOC 320, the Read Request 310 may adhere to the PCIe transaction layer packet (TLP) format for a read request, where the TLP header may be used to indicate a key table index and an offset to the LBA, so as to facilitate the encryption of the requested data by the Crypto Controller 322. If Read Request 310 is not encrypted, Crypto Controller 322 is not engaged and SOC 320 relays Read Request 330 to Memory 360 via IOMMU 328. Responsive to the request, Memory 360 transmits Read Response 332 to SOC 320 via IOMMU 328.

Crypto Controller 322 receives the requested data in Read Response 332 and encrypts the requested data according to the disclosed embodiments. In certain embodiment, the response includes one or more data packets. A data packet generally may include a header portion and a payload portion. The payload portion of the packet includes data which may be encrypted. The Crypto Controller 322 uses the Key lookup index and offset to the LBA in the Read Request 310 to select the encryption key (and optionally additional encryption parameters). The requested data is encrypted using the encryption keys. The encryption keys may be provided by Software 340. As stated, SOC's communication with the endpoints may be governed by the PCIe protocol which allows, for example, PCIe endpoints to attach up to four 32-bit headers to the TLP packets as described according to an embodiment herein. A PCIe endpoint has the choice of sending any additional data in these headers. The header may be added by NVMe controller 304.

An embodiment uses the TLP Prefix in the header of a TLP packet to send the key table index and the offset value. In another embodiment, some of the address bits in the header of Read Request 310 (and Write Request 370 described herein below) may be used to indicate the key table index and an offset to the LBA. In the PCIe context, the address bits may be comprised in the TLP header. An example is outlined in connection with FIG. 11 below. The Read Request 310 and Write Request 370 may be DMA requests that can have 64 bits of address information. The address information can be one of the following three information: physical address, Guest Physical Address, or IO Virtual Address. A number of the available address bits may be used to index a table of 4K entries with 8 bytes per entry (i.e., 32 K byte table). The remaining available bits may be used for offset to the base LBA in the table. An example of such provisioning of the address bits will be explained in more detail in reference to FIGS. 5 and 6 below.

The Crypto Controller 322 parses and removes this header information and uses the index field to look up a record/entry in a table and the offset field to calculate the actual LBA from the base LBA. Exemplary encryption (or decryption) methods are discussed further below in relation to FIGS. 5, 6 and 7.

In one embodiment, Crypto Controller 322 selects requested data read from memory 360 for encryption. In an example implementation, this selection is based on a BUS DEVICE FUNCTION (BDF) that is used to identify one or more NVMe drives. Software 340 (which may include one or more of an operating system (OS), a software application, host driver, etc.) may provide the BDF of the NVMe drive 302 using a software interface to Crypto Controller 322 (not shown). Data read from memory 360 for storage on the NVMe drive 302 is encrypted by the Crypto Controller 322 before passing the read data to the NVMe drive. Encrypted data emanating from the NVMe drive 302 is decrypted by the Crypto Controller 322 before passing it to another device, e.g., to memory 360. Data emanating from other devices may not be encrypted/decrypted by the crypto controller in some embodiments. As described further below, Key Lookup Table (KLT) 326 stores one or more tables. In one embodiment, KLT 326 provides information including KeyID, LBA, and File Information (per file) to Crypto Controller 322. In certain embodiments, KLT 326 may comprise a read/write bit (not shown) that allows drive read/write.

The requested read data refers to the data that is requested by the host (e.g., software 340) using the command stream. The command stream is composed by the software 340 and is sent to NVMe drive 302 and then the NVMe drive 302 sends it back in the TLP Prefix (during the DMA session) provided in Read Response 332. The SOC 320 reads the data from the memory, the crypto controller encrypts the data and the encrypted data 312 is communicated to NVMe drive 302. NVMe Controller 304 receives and stores the encrypted data in the SSD flash memory 303. The encrypted data 312 is then written to the NVMe drive 302 as indicated by SSD write operation 301. Because encryption is done at SOC 320, the entire encryption operation is done at inline DMA speed and no delay is introduced due to components external to the SOC 320.

FIG. 3B illustrates a system architecture for a memory write process at line speed. I FIG. 3B, NVMe Drive 302 is intending to write data into memory 360. The process begins with NVMe Drive 302 issuing Write Request 370. Write Request 370 may comprise encrypted data as illustrated by the hatching of arrow 370. Thus, in one embodiment where the data stored in the NVMe 302 is to already encrypted, NVMe Controller 304 may encrypt the payload data to be transmitted in Write Request 370.

SOC 320 receives encrypted Write Request 370 from NVMe Controller 304. Write Request 370 includes encrypted data from the SSD flash memory 303 of the NVMe drive 302. To facilitate decryption of the data at the Crypto Controller 322, the Write Request 370 includes key table index and optionally further an offset to the LBA. As described before in connection with the Read Request 310, when using a PCIe link between the NVMe drive 302 and the SOC 320, the Write Request 370 may adhere to the PCIe TLP format for a write request, where the TLP header may be used to indicate a key table index and the offset to the LBA. Crypto Controller 322 decrypts the encrypted data from Write Request 370 using key information from Software 340, Key lookup table from KLT 326 and hardcoded cypher keys from Hardware Key Engine 324. The decrypted data of Write Request 370 is then transmitted to Memory 360 as illustrated by arrow 372. Memory 360 then writes data to allocated memory slots. In one embodiment, the address indicating the memory location in memory 360 for writing the data can be indicated in the header of the Write Request 370. In this example, the Key Engine 324 is indicated in FIGS. 3A and 3B is part of the SOC 320. The Key Engine 324 may be implemented within the Crypto Controller 322.

Figures 4A, 4B:
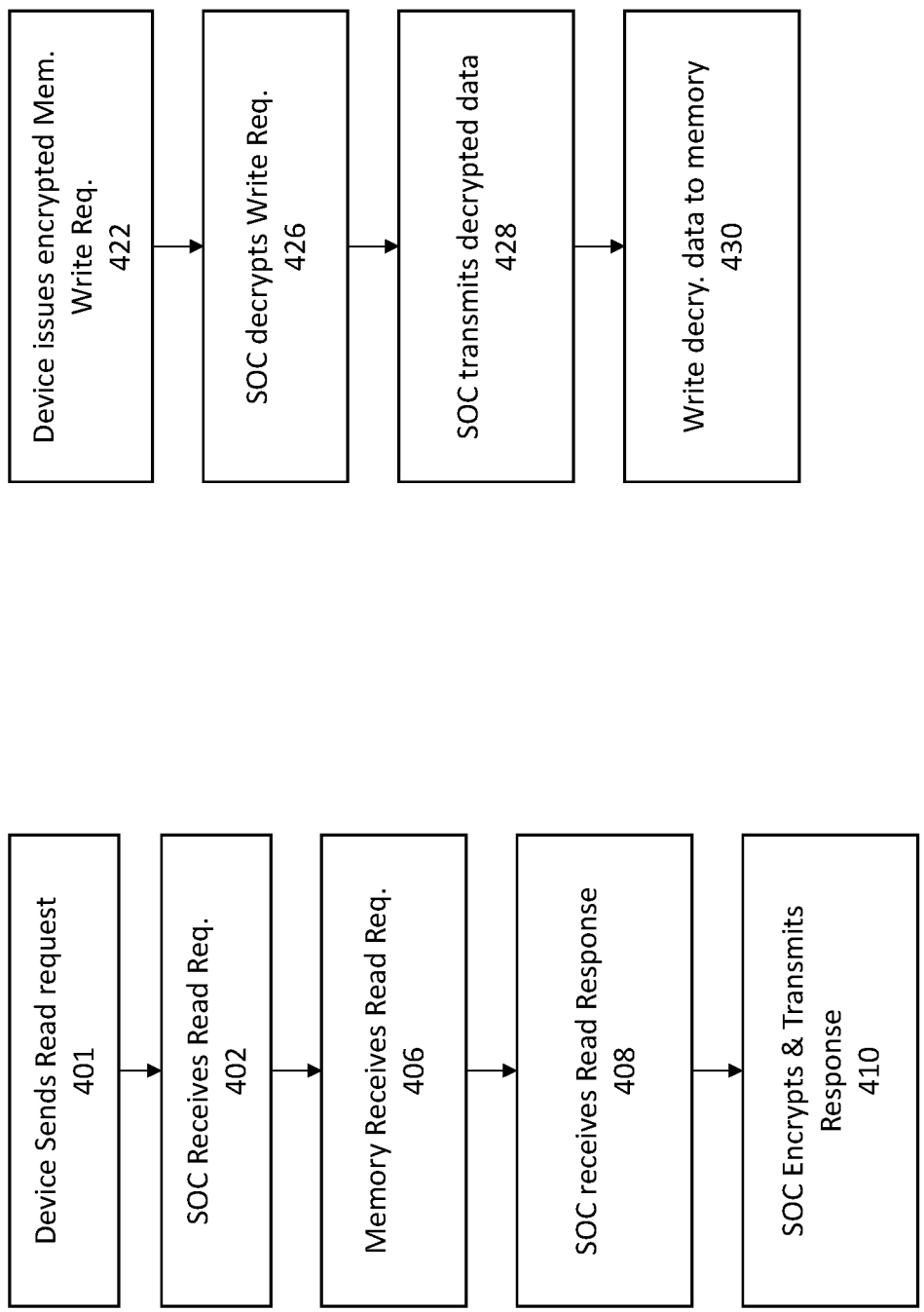
FIGS. 4A and 4B illustrate flow diagrams according to some embodiments.

FIG. 4A shows an exemplary inline encryption for writing data onto an NVMe SSD. As described in relation to FIG. 3A, NVMe (SSD) issues a Read Request 310. This is shown as operation 401 in FIG. 4A. The Read Request 310 is a DMA request transmitted from the NVME drive 302 (e.g. controller 304) to SOC 302. At operation 402, the SOC 320 receives the Read Request 310 and transmits the a Read Request 330 to the external memory 360 to request the data to be read from the memory 360. At operation 406, the external memory 360 responds to the Read Request 330 with a Read Response 332 containing the requested data. At operation 408, the Read Response 332 including the data (unencrypted) is received at the SOC 320. At operation 410, SOC's Crypto Controller 322 (not shown) encrypts the data using hardware keys, key index and other cryptographic key information before transmitting the encrypted data 312 to the NVMe drive 302. The Read Request 310 may comprise encryption information, including a key table index and optionally an offset of the LBA in order to enable the SOC's Crypto Controller 322 selecting the encryption key(s) and optionally the encryption parameters for encryption of the requested data from memory 360. It should be noted that neither SOC 320 nor NVMe drive 302 may decrypt the data that is to be stored in flash memory of the NVMe drive 302; rather, the data is stored as encrypted data.

FIG. 4B shows an exemplary inline decryption process for writing data onto a memory module external to the NVMe. As described in relation to FIG. 3B, at operation 422, NVMe (SSD) issues a Write Request 370 to the SOC. In one embodiment, the Write Request 370, which may contain encrypted data, is encrypted by the NVMe Controller (304, FIG. 3B). The Write Request 370 is transmitted to the SOC 320. At operation 426, the SOC 320 decrypts the encrypted data in the Write Request 370 at the Crypto Controller 322 of the SOC 320. The decrypted data from Write Request 370 is then transmitted to the memory in Write Request 372 as indicated in Operation 428. At operation 430, the memory 360 receives and writes the decrypted data into the appropriate memory slots.

Referring once again to FIGS. 3A and 3B, in one embodiment Software 340 sets up the command stream (i.e., a software command stream that is generated by the host driver) in Memory 360 and Key Lookup Table in Memory 327 in the Crypto Controller 322 as will be discussed on more detail in connection with FIGS. 8A and 8B. As stated, the KLT 326 may be integrated with Memory 327 or can be in DRAM 360.

Figure 5:
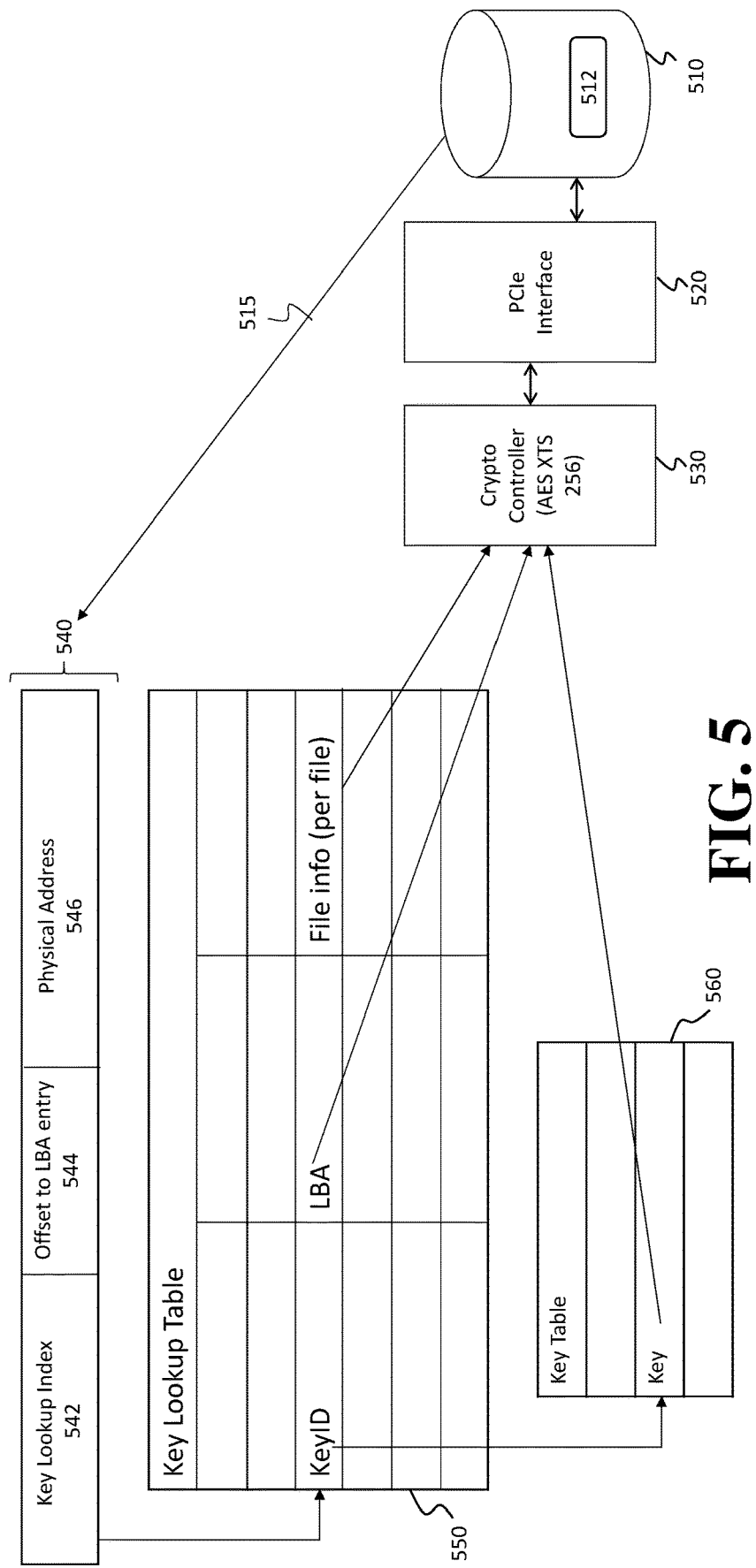
FIG. 5 illustrates a key lookup table according to one embodiment of the disclosure in which a single Key Id is used.

FIG. 5 illustrates a key lookup table according to one embodiment of the disclosure in which a single Key Id is used. In FIG. 5, NVMe drive 510 is shown with an NVMe Controller 512. As discussed in reference to FIGS. 3A and 3B, Crypto Controller 530 may correspond to Crypto Controller 322 which encrypts/decrypts transactional data. The PCIe Interface 520 represents the interface between the Crypto Controller 530 and the NVMe drive 510. Crypto Controller 530 in FIG. 5 may for example use the encryption standard AES-XTS-256 for encryption and decryption of data. As illustrated by arrow 515, address data 540 indicative of the physical address for DMA (64 bit) read or write access to memory 360 is initiated by NVMe drive 515. In one embodiment, address data 540 includes key lookup index 542, LBA offset 544 and the physical address 546 of the data to be read or written. The address data 540 is comprised in the read request or write request provided to the SOC comprising the crypto controller 530 via the PCIe interface 520. Address data 540 is used by the crypto controller 530 (also 322, FIG. 3A, 3B) to retrieve additional information for encrypting/decrypting the data. The KLT 550 may be stored at SOC 320 (see, KLT 326 in FIG. 3A, 3B). The key lookup index 542 in the data 540 may be used by the crypto controller 530 (also 322, FIG. 3A, 3B) to retrieve KeyID, LBA and file information data (used to encrypt data) from the KLT 550. Key ID of KLT 550 may provide the key(s) for encryption/decryption of data (see Key table 560). The file information data may provide additional information for generating a tweak for the encryption/decryption.

Figure 6:
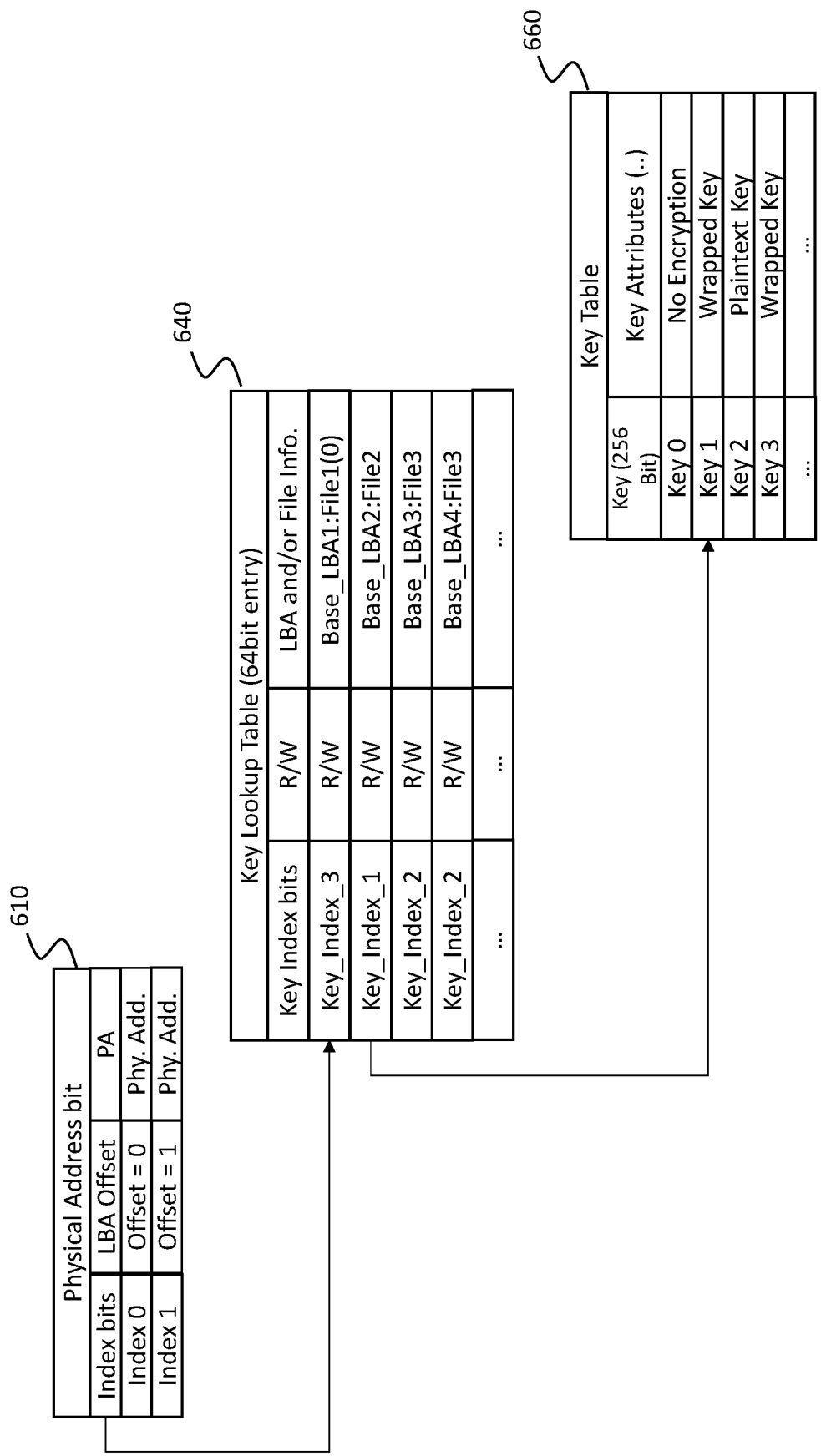
FIG. 6 schematically illustrates an exemplary key look up process according to one embodiment of the disclosure.

FIG. 6 schematically illustrates an exemplary key look up process according to one embodiment of the disclosure. In FIG. 6, Table 610 illustrates an exemplary Physical Address Bits table with fields that identify the Index bits (key index), LBA Offset and Physical Address of the read/write data. The information of Table 610 may be provided by the NVMe drive 515 to the Crypto Controller 530 within the address data 540 of the read or write request, as outline above. Using the appropriate key index, the Crypto Controller 530 may then go to KLT 640. The entries in KLT 64 may be 64 bit wide. In the example of FIG. 6, the KLT 640 comprises the following exemplary fields: Key Index bits, Read/Write (R/W) and LBA and/or File Info. The R/W field defines whether information is read or written. The LBA and/or File Info field provides the material to generate the tweak for the AES-XTS encryption/decryption or another encryption standard requiring the tweak. The LBA offset is taken from Table 610.

Finally, using the information from Table 640, information from Key Table 660 can be invoked. Key Table 660 has two fields: Key (256 bit) and Key Attribute field which identifies the encryption attribute or type which must be used by Crypto Controller 530. It should be noted that the tables shown in FIG. 6 are illustrative and additional tables and/or fields may be added without departing from the disclosed principles.

The following illustrates an implementation according to one embodiment of the disclosure. In reference with FIGS. 3A, 3B, 5 and 6, when a Read Request 310 or Write Request 370 from the NVMe drive (302, FIGS. 3A, 3B) is issued, Crypto Controller 322 (FIGS. 3A, 3B) extracts the key lookup index 542 from the address bits (address data 540 in FIG. 5, Table 610, FIG. 6). The Crypto Controller 322 also obtains the base LBA (BASE_LBA) and the Key Index from Key Lookup Table (550 in FIG. 5, 640, FIG. 6) and then looks up the Key from Table 560/660 and optionally the Key attributes using the Key Index.

Crypto Controller 322 adds the LBA offset in the address bits 540, 610 to the BASE_LBA in the Table 550 (FIG. 5). The final LBA is the sum of the two values. This information provides Crypto Controller 322 with all the inputs for encrypting/decrypting the data (e.g., according to AES-XT5-256) in the PCIe TLP packets sent by (or being sent to) the NVMe driver 302. Based on this information, Crypto Controller 322 encrypts the data payload in the TLP packets on the way to the NVMe drive 302 and decrypts the data packets on the way to the memory.

In certain embodiments, depending on the attributes in the Key Lookup Table (Table 550 in FIG. 5, Table 660 in FIG. 6), a Crypto Controller 322 may optionally decide not to encrypt or decrypt a the data of a packet. In some embodiments, Software 340 may mark some packets as non-encrypt (e.g., by pointing to a no-encrypt key entry). For example, the packets provided from the SoC 320, 530 to the NVMe drive 302, 510 may also include command packets for the NVMe drive 302, 510, which need to be processed in the NVMe drive 302, 510 (e.g. by the controller 304, 512). In order to make sure that the NVMe drive 302 has the access to the data within command packets and to ensure that the NVMe drive 302 can process the command packet, some packets (e.g., the command packets) may therefore be marked as non-encrypt.

The optional R/W bit shown at Key Lookup Table 640 (FIG. 6) may be introduced for increasing the security of the system. The R/W bit in the KTL may ensure that the records in the KLT 640 marked as 'R' can only be used for decryption while the records in the KLT 640 marked as 'W' can only be used for encryption. In one embodiment, the R/W indications may correspond to Read and Write to the NVMe drive 302. This is the reverse of the Read and Write to the Memory 360, e.g., when data is written to the NVMe drive 302, it is read from memory 360 and when data is read from the NVMe drive 302, it is written to memory 360.

The above embodiments are generally applicable to single encryption of the data, for example, using PCIe-based cryptography. These embodiments are further applicable to, for example, data at rest. However, there are government and Cloud Service Provider (CSP) scenarios in which double encryption may be desired. For example, a Virtual Memory (VM) owner may like to protect its data such that the CSP cannot access it while the CSP may wish to restrict the VM owner from moving this data to another CSP. Double encryption also protects the data from the compromise of one of the keys in a CSP scenario or an incorrect implementation of the encryption. This enables VM owner to provide a key while the infrastructure may provide a separate key.

In other embodiments of the disclosure, there are multiple keys may be used for encrypting and decrypting the data. In one example, the KTL records may identify the keys for the encryption and decryption and may still be indexed using the key lookup index 542 as exemplarily shown in FIG. 5, as will be explained based on the example of FIG. 7 herein below in more detail.

For example, in the above noted scenarios, there may be two keys: the first key is at the service level that is provisioned to the VM owner and the second key may be provisioned to the infrastructure provider or CSP. The dual encryption may run at line speeds (e.g., PCIe Gen 5) while enabling two or more (N) keys. For simplicity, the following descriptions are provided with for a dual-key implementation. The dual-key implementation may comprise an infrastructure-key and a service-key. The infrastructure-key may be owned by the infrastructure provider while the service-Key may be owned by the container- or the VM-owner. The service owner may be prevented from controlling the infrastructure on which its service will run. Conversely, the infrastructure owner may be prevented from controlling or determining which of all services they will run.

The system implementation described in relation to the inline encryption mechanism described above may be similarly applicable to multiple encryption keys with disparate owners. That is, in the case of a single inline encryption, the encryption engine gets all the key material and the tweak material from the key table and the key lookup table (KLT). This concept may be extended to provision a second key index in the key table itself.

Figure 7:
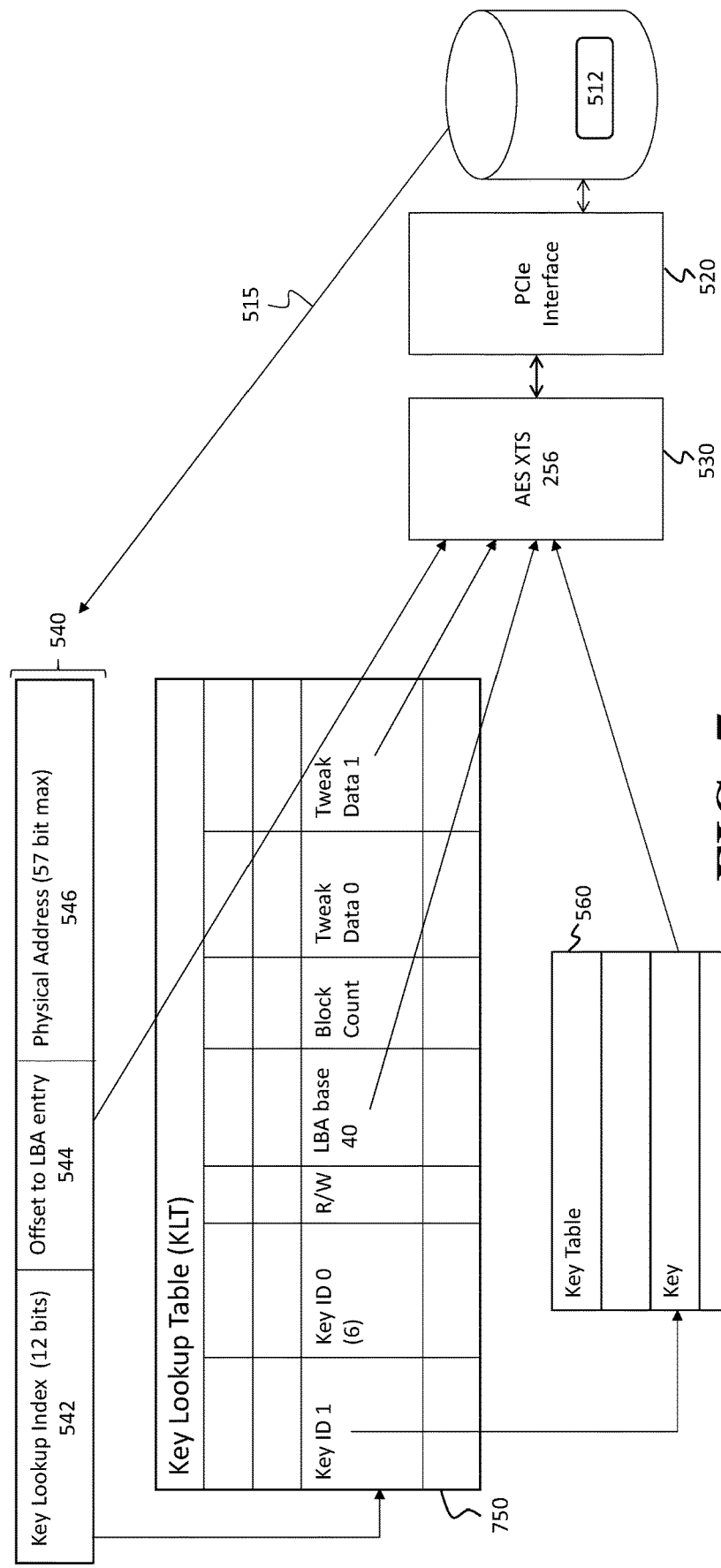
FIG. 7 schematically illustrates a dual encryption technique according to one embodiment of the disclosure.

According to this embodiment, the crypto controller, such as the Crypto Controller 530 or 322, is extended to look up two key indexes in an extended KLT 550, 640 (the records of the KLT may comprise two key indexes (Key IDs) instead of one key index—see KLT 750 in FIG. 7), read the keys from the key table 560, 660 for encryption or decryption. The process may for example involve two AES key expansions to generate two sets of round keys, two set of tweaks and then do 28 rounds of encryption, 14 rounds per key. The final LBA for both tweaks may be the same. However, it is also possible to change the tweak key for the two tweaks so that two different tweaks are used for the two sets of round keys. As before, the input data may be the data in the PCIe TLP from the NVMe drive (e.g. 302, FIG. 3A, 3B) or data from memory (e.g. 360, FIG. 3A, 3B) and the output will be encrypted or decrypted ciphertext/plaintext depending on whether it is a write or read transaction. The crypto controller (322, FIG. 3A, 3B) can process all the keys at line speeds in an inline fashion without ever releasing the keys to system software (340, FIG. 3A, 3B). In one embodiment, software (340, FIG. 3A, 3B) may choose which keys should be used by the encryption/decryption engine (214, FIG. 3; 325, FIG. 3) and in which order by appropriately populating the key table.

In certain embodiments, the data may be encrypted with the first key first and the ciphertext that is generated is then encrypted with the second key. The size of the plaintext, intermediate cipher text and the final ciphertext may be substantially the same since AES-XTS does not increase or decrease the size of the data. Finally, if the system software Software 340, FIG. 3A, 3B) so chooses, it may decide to only decrypt using the second key by only putting the second key in the table (in the first key slot) and leaving the second key slot empty. This allows the software to unbind the data from infrastructure encryption while the service encryption stays. Software can now move this data to another infrastructure and encrypt it using the infrastructure-key of the second infrastructure. This overcomes the challenges of the conventional AES-NI as the latter does not have dual encryption capabilities and would require multiple read/write cycles.

FIG. 7 schematically illustrates a dual encryption technique according to one embodiment of the disclosure. The dual encryption technique of FIG. 7 is similar to the single encryption technique of FIG. 5. Accordingly, similar elements are numbered similarly. Referring to FIG. 7, key lookup table 750 has two key IDs: Key ID 1 and Key ID 0. Each of the two Key IDs may be defined distinctly at Key Table 560. In one embodiment, Key Table 560 may be populated by the Virtual Memory Manager (VMM) running the VM (e.g., NVMe 302, FIG. 3A, 3B) It is also possible that some keys in the Key Table 560 may be populated by the VMM and some keys by the VM. Each key in the Key Table 560 may be associated with a respective Key ID Index and KLT 750 will contain the indexes for at least two keys (e.g., Key ID0, Key ID 1).

In an exemplary implementation of a DMA transaction (e.g. a Read Request 310 or Write Request 370), the crypto controller (e.g. 322 or 530) reads KLT 750, identifies the keys and performs two key expansions. The key expansions lead to 28 round keys (1 key for each round). The crypto controller caches the round keys (e.g., at memory 327, FIG. 3A, 3B) and encrypts or decrypts the data though encryption/decryption engine 325. Each encryption may have its own tweak data. Thus, in certain embodiments, one encryption may use LBA as the input nonce for the tweak while the other encryption may use file data as the input nonce for the tweak.

Figure 8A:
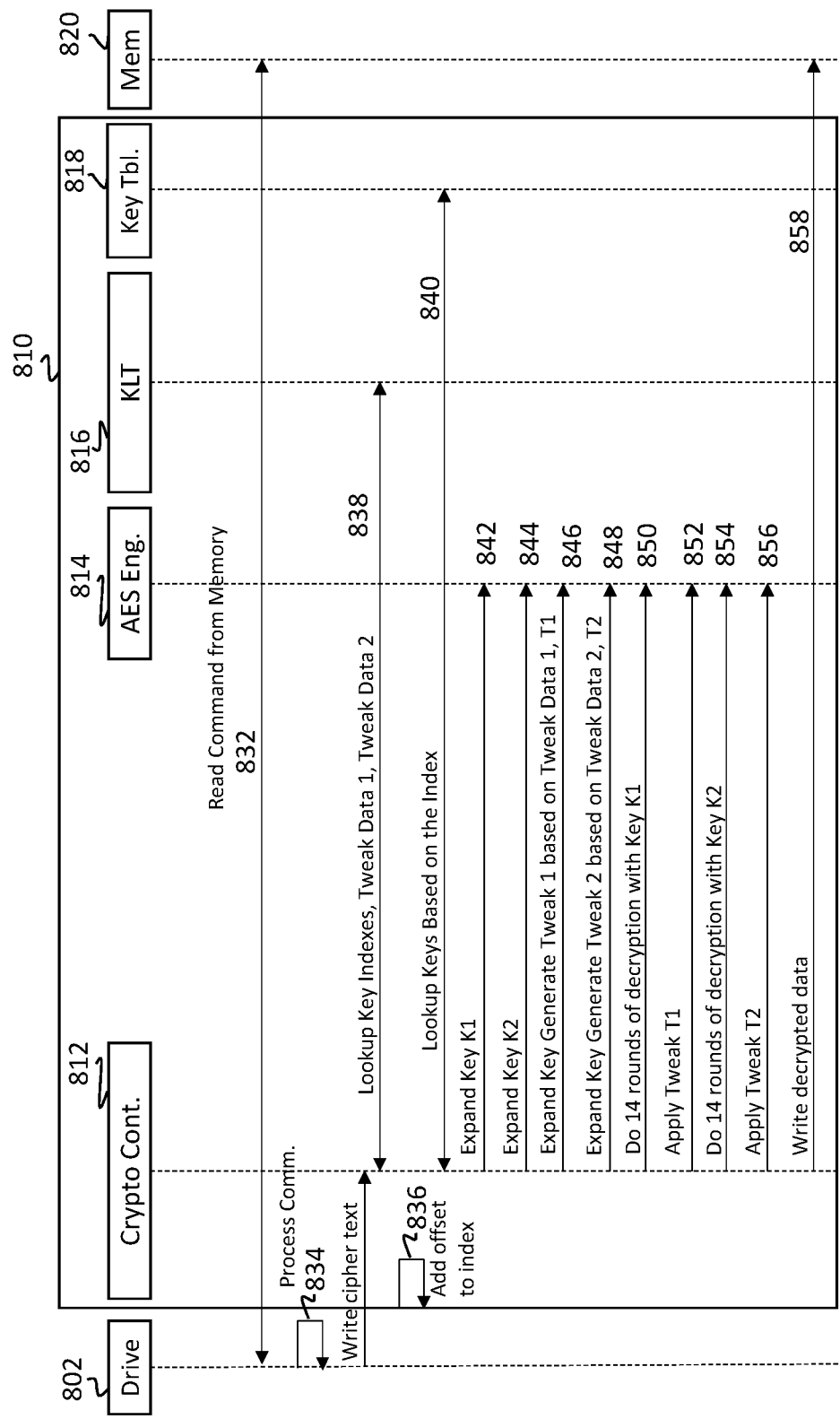
FIG. 8A is an exemplary decryption flow diagram according to one embodiment of the disclosure.

FIG. 8A is an exemplary decryption flow diagram according to one embodiment of the disclosure. The system of FIG. 8A comprises drive 802, SOC 810 and Memory 820. Drive 802 may comprise an NVMe drive, such as NVMe drive 302 or 510. Memory 820 may be a memory such as memory 360 (FIG. 3A, 3B). Memory 820 may comprise a DRAM. SOC 810 may comprise Crypto Controller 812, AES Engine 814, KTL 816, and Key Table 818. SOC 810 may comprise several Crypto Cores (not shown). For simplicity, only Crypto Controller 812 is shown. Crypto Controller 812 may be for example an implementation of the Crypto Controller 822 or 530 discussed previously. Further, Crypto Controller 812 may comprise an encryption/decryption engine (not shown), which may be, for example, similar to crypto engine 325, FIG. 3A, 3B. AES Engine 814 may be stored in a memory circuitry (see, e.g., memory 327, FIGS. 3A, 3B) associated with SOC 810. AES Engine 814 may store information for encryption/decryption according to the AES-XTS standard. Key Lookup Table 816 may be similar to KLT 550 or 640 in FIG. 5 or FIG. 6, or KLT 750 shown in FIG. 7. In this example, KLT 816 may store multiple records, each including (N) Key IDs, Read/Write bit, LBA base, Block Count and Tweak data sets corresponding to each of the N keys. Key Table 818 may include key information for each of the N encryption/decryption keys. The exemplary process of FIGS. 8A and 8B relates to N=2.

The process begins at operation 832 when Software 340 intends to transfer data from the drive 802 to Memory 820 (through SoC 810, crypto controller 812). The read communication of reading the data from the Drive 802 into Memory 820 may be a DMA transaction. This operation 832 may involve the Drive 802 obtaining a corresponding read command from the Memory 820. Read Communication 832 may include a Read Command provided to the Drive 802 indicating a memory location within the flash memory of Drive 802 that is to be written into Memory 820, and address information of Memory 820 to which the data from the Drive 802 is to be written. The Read Command 832 may thus not be encrypted when passed from the SOC 810 to the Drive 802, so that Drive 802 can process the command. At operation 834, Drive 802 processes the received Read Command. This may involve receiving the requested data from indicated memory location with a SSD flash memory of the Drive 802. This requested data in the Drive 802 is encrypted. At operation 836, Drive 802 communicates a write request including the Cipher text, and a header comprising the determined LBA offset and key table index to Crypto Controller 812 of SOC 810. For example, this operation 836 may similar to the Write Request 370 in FIG. 3B. Based on the information contained in the header of the Write Request 836, Crypto Controller 812 reads the record indexed by the key table index from KLT 816 and obtains Key Indexes (Key IDs) as well as Tweak Data 1 and 2 as indicated by arrow 838. It should be noted that in one implementation, the tweak is generated from the LBA and the LBA is calculated from the LBA base address and the LBA offset indicated in the Write Request 386. Using the Key Indexes, Crypto Controller 812 then looks up the corresponding two Keys at Key Table 818 as shown by arrow 840. In one embodiment, the drive does not have to process the LBA offset and the KLT index. It does not know anything about it. It needs to send it back in the TLP prefix embodiment.

Crypto Controller 812 then expands each of Key 1 and Key 2 as schematically illustrated by arrows 842 and 844. This information is communicated to AES Engine 814. Crypto Controller 812 also expands Key Generated Tweak 1 based on Tweak Data 1, T1 (as illustrated by arrow 846) and Key Generated Tweak 2 based on Tweak Data 2, T2 (as illustrated by arrow 848).

Next, using the first Key (K1), Crypto Controller 812 implements 14 rounds of decryption and communicates the results to AES Eng. Crypto Controller 812 applies the first Tweak (T1) as illustrated by arrow 852 and communicates the same to AES Eng. 814. The process for K1 is implemented for the second Key. At operation 854, using the second Key (K2), Crypto Controller 812 implements 14 rounds of decryption and communicates the results to AES Eng. 814. At operation 856, the Crypto Controller 812 applies tweak T2. Finally, at operation 858, the decrypted data is written to memory 820. Note that operation 858 may correspond to the Write Request 372 in FIG. 3B.

Note that operations 836-858 may be considered a more detailed example implementation of operations 422-428 in FIG. 4B, where operation 836 corresponds to operation 422, operations 838-856 are an example implementation of operation 426, and operation 858 corresponds to operation 428.

The distinction between the read command and read data should be noted as the drive has to process the command and hence the command is not encrypted to allow the drive to process the command. The drive does not care about the type of payload data, data may or may not be encrypted. The read command above is identifying the memory location of the data in memory and the LBA of the data in the flash. The data will be read from memory, encrypted by the crypto controller, and sent to the drive so that the drive can store it at the LBA in the flash.

Figure 8B:
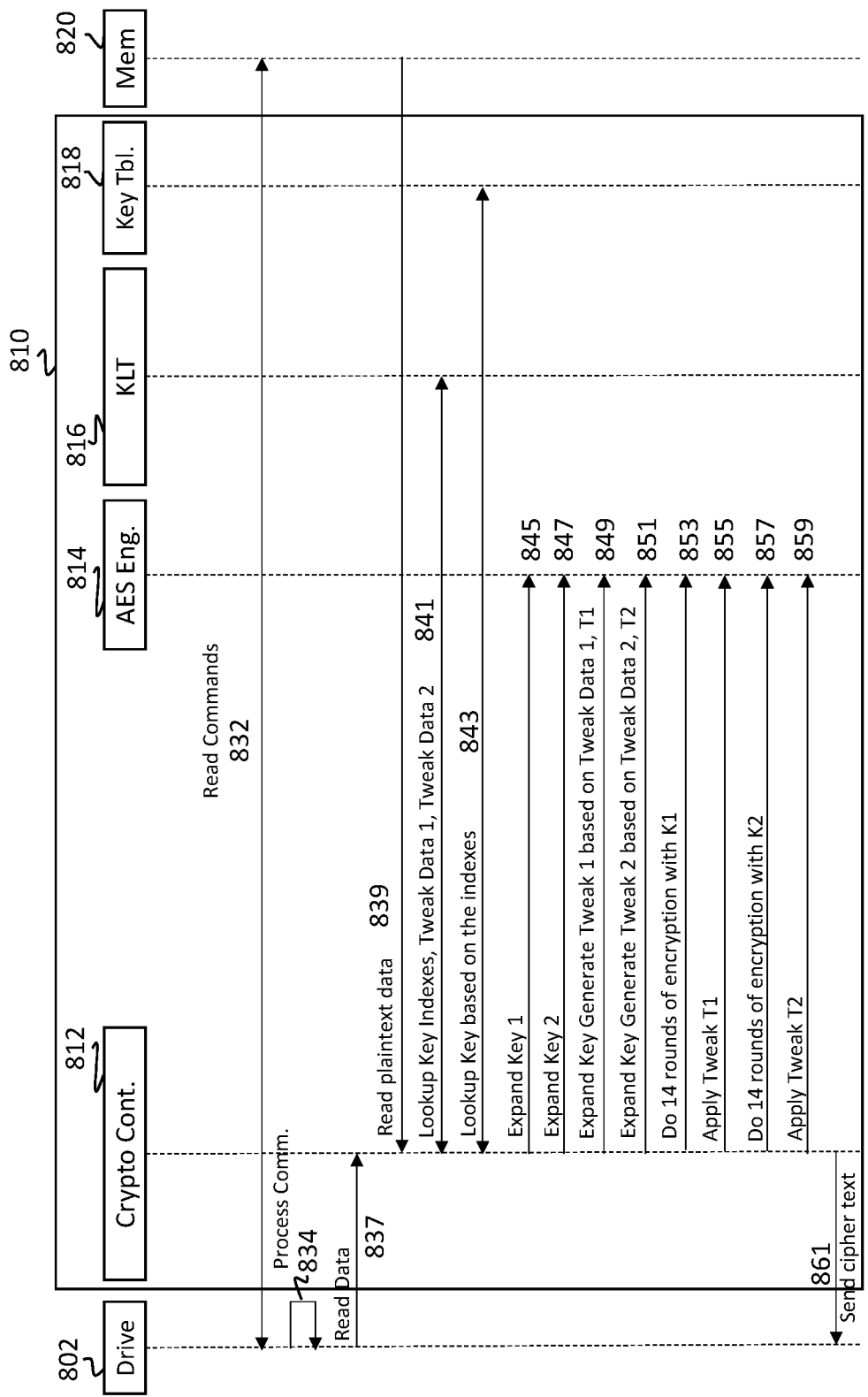
FIG. 8B is an exemplary encryption flow diagram according to one embodiment of the disclosure.

FIG. 8B is an exemplary encryption flow diagram according to one embodiment of the disclosure. Certain portions of FIG. 8B are substantially similar to those show in FIG. 8A and are similarly numbered. In FIG. 8B, the encryption process begins when the Drive 802 issues a Read Command 832 which is directed to Memory 820. At operation 837, Drive 802 processes the Read Command.

At operation 837, the Drive 802 sends a Read Request to SOC 810 in order to read the data from Memory 820. The Read Request 837 may correspond to the Read Request 310 described in connection with FIG. 3A. The Read Request indicates the address information of the data to be read from Memory 820. The Read Request may further comprise a header. The header may include an LBA offset and a key table index determined at operation 834 associated with the data that are to be retrieved from Memory 820. (It should be noted that FIG. 10 (discussed below) shows the tags in the command stream. These tags may be used by software 340 to communicate the key index and the offset to the drive.) At operation 839, Crypto Controller 812 reads Plaintext Data corresponding the data indicated in the Read Request from Memory 820. Crypto Controller 812 uses the header information in the Read Request to look up the Key Indexes (Key IDs for Key 1 and Key 2) and Tweak Data 1 and 2 (corresponding to each of the two Key indexes) from KLT 816 as illustrated in Operation 843. At operations 845 and 847, Crypto Controller 812 expands Key 1 and Key 2 and communicates the expanded Keys K1 and K2 to AES engine 814. At operation 849, Crypto Controller 812 sends the expand Key Generate Tweak 1 based on Tweak Data 1, T1, to AES Engine 814. The same is performed for Tweak 2 based on Tweak Data 2, T2, as illustrated at operation 851. As noted in connection with FIG. 8A, the Tweak Data 1 and 2, T1 and T2, may be generated based on the LBA that is derived from the LBA offset in the Read Data request 837 and the LBA base address.

At operation 853, Crypto Controller 812 implements 14 rounds of encryption of the Plaintext Data received from Memory 820 in operation 839 using the expanded KeyK1. At operation 855, Crypto Controller 812 applies Tweak T1. Similarly, at operations 857 and 859, Crypto Controller 812 implements 14 rounds of encryption with expanded Key K2 and applies Tweak T2. The encryption of the Plaintext Data using the expanded Keys K1 and K2 and the Tweaks T1, T2 is implemented using AES Engine 814, which provides the encrypted data (cypher text). At operation 861, Crypto Controller 812 sends cipher text to Drive 802. As discussed in reference to FIG. 3A, the encrypted data 861 is the received at the controller (see FIG. 3A) of Drive 802.

Note that operations 837-861 may be considered a more detailed example implementation of operations 401-410 in FIG. 4A, where operations 837 and 839 are an example implementation of operations 401-408, and operations 841-861 are an example implementation of operation 410.

Another embodiment of the disclosure relates to file encryption (in contrast to volume level encryption) using inline cryptography for PCIe devices. Both, file encryption and volume level encryption can be implemented using the mechanisms described in connection with FIGS. 3A, 3B, 8A and 8B herein above.

Conventionally, data at rest is protected in two common ways. The first technique is volume level encryption where the entire drive volume is encrypted with the same key and the volume key is then encrypted with a key derived from the user password in order to make sure that the volume is bound to the user. This may be for example realized in the examples described in connection with FIGS. 3A, 3B, 8A and 8B herein above by the key table index in the Write Request 370, 836 and Read Request 310, 837 pointing to the same key or set of keys for encryption/decryption for all data stored on or read from the NVMe drive. The second technique of encrypting data at rest is file level encryption. In file level encryption, the file system identifies the data blocks of each file and all the data blocks of the file are encrypted with a unique key that is unique to the file. File level encryption is an expensive process due to extensive key management and the need to be able to switch keys at block granularity. This may be for example realized in the examples described in connection with FIGS. 3A, 3B, 8A and 8B herein above by the key table index in the Write Request 370, 836 and Read Request 310, 837 pointing to the same key or set of keys for encryption/decryption for all data of a particular file stored on or read from the NVMe drive.

File level encryption has several advantages. First, file level encryption allows separation of files across containers and VMs even if the VMs have access to the same volume. Containers are typically not assigned a volume. Second, file level encryption enables the Operating System (OS) to only encrypt data that is sensitive and not encrypt non-sensitive data. Finally, using file level encryption the same encrypted file can be sent over a network to the cloud without having to decrypt the storage and re-encrypt the file for the cloud. Thus, file level encryption is advantageous over volume encryption. Self-encrypting drives conventionally perform volume encryption because the drive does not have any idea of what a file is nor does it know which blocks belong to a particular file. Software performs file level encryption using software encryption or by accelerating the software encryption using AES-NI or some other crypto accelerator.

Thus, certain embodiments of the disclosure relates to file level encryption in an inline fashion such that the software can still choose the keys, blocks and file information but the file is automatically encrypted and decrypted inline. In some embodiments, the software may not have to program a crypto controller or use a crypto accelerator to encrypt the file.

The mechanism for reading and writing a non-encrypted file may be substantially similar to the writing or reading an encrypted file as provided in the above-described embodiments, for example, in relation to FIGS. 3A and 3B and FIGS. 8A and 8B. In one embodiment, the disclosed mechanism is modified for file encryption. The inline encryption engine looks up the table (KLT 326, FIG. 3A, 3B) for file metadata and other key entries. The file metadata may contain a unique identification of a file. Software 340 can then decide what it wants to put in the file metadata, as will be further discussed with reference to FIGS. 11 and/or 12. The crypto engine (325, FIG. 3A, 3B) of the SOC may then perform AES-XTS on the file data by using the metadata to generate a unique tweak for the file. The unique per-file tweak can generate a unique cipher text even if two identical files are encrypted with the same key. Further, the software overhead is reduced since the software 340 does not have to keep track of the ciphertext and plaintext.

In one embodiment, the disclosure provides a table-based approach where the software (e.g., software 340, FIGS. 3A, 3B) manages a table (KLT 326, FIGS. 3A, 3B) and adds file metadata into the table. The metadata is then consumed by the inline encryption engine that generates a unique per file tweak and performs encryption. Finally, the drive (e.g., NVMe Drive 302, FIGS. 3A, 3B) is ignorant of this encryption because the drive receives an encrypted block of data and it has to store the encrypted block data in the appropriate block on writes and read the same ciphertext on reads.

The disclosed embodiment provides several advantages. First, the file level encryption works well for multiple-users, containers and VMs that share volumes. Second, the inline file level encryption ensures that the files can be encrypted without significant software overhead and the files can even be transferred from the client to the cloud without having to perform multiple layers of decryption and encryption. Third, file level encryption allows the software to select which blocks to encrypt and which ones not to encrypt. Finally, the data portability and security increases since all the data is no longer encrypted with the same key and the data can be easily moved across volumes.

As discussed, an exemplary inline crypto engine encrypts and decrypts the data on the DMA path of the NVMe drive. This encryption and decryption is implemented inside the SOC. In some embodiments, the encryption uses the AES-XTS256 standard. A unique attribute of AES-XTS256 is that it uses two 256-bit keys in which the first key is used for encryption or decryption using the AES rounds and the second key is used for generation of a tweak.

The tweak protects from known plaintext attacks where two pieces of plaintext encrypted using the same key will lead to the same ciphertext. To protect from such attacks, a tweak is conventionally used which is generated by encrypting a nonce with the second key. The generated tweak is subsequently used to XOR the plaintext and the ciphertext of the encryption such that even two plaintexts encrypted with the same key will lead to different cipher texts due to different tweaks.

In one embodiment of the disclosure, this property is extended by using file information data in the tweak nonce. Instead of arbitrarily using the LBA for the input nonce to the tweak, an embodiment of the disclosure uses inode for generating the tweak (such as the Tweaks 1 and 2 of FIGS. 8A, 8B). The file inode is a data structure that is associated with a file and keeps all the attributes of a file. The inode may either point to a file or to a directory.

Figure 9:
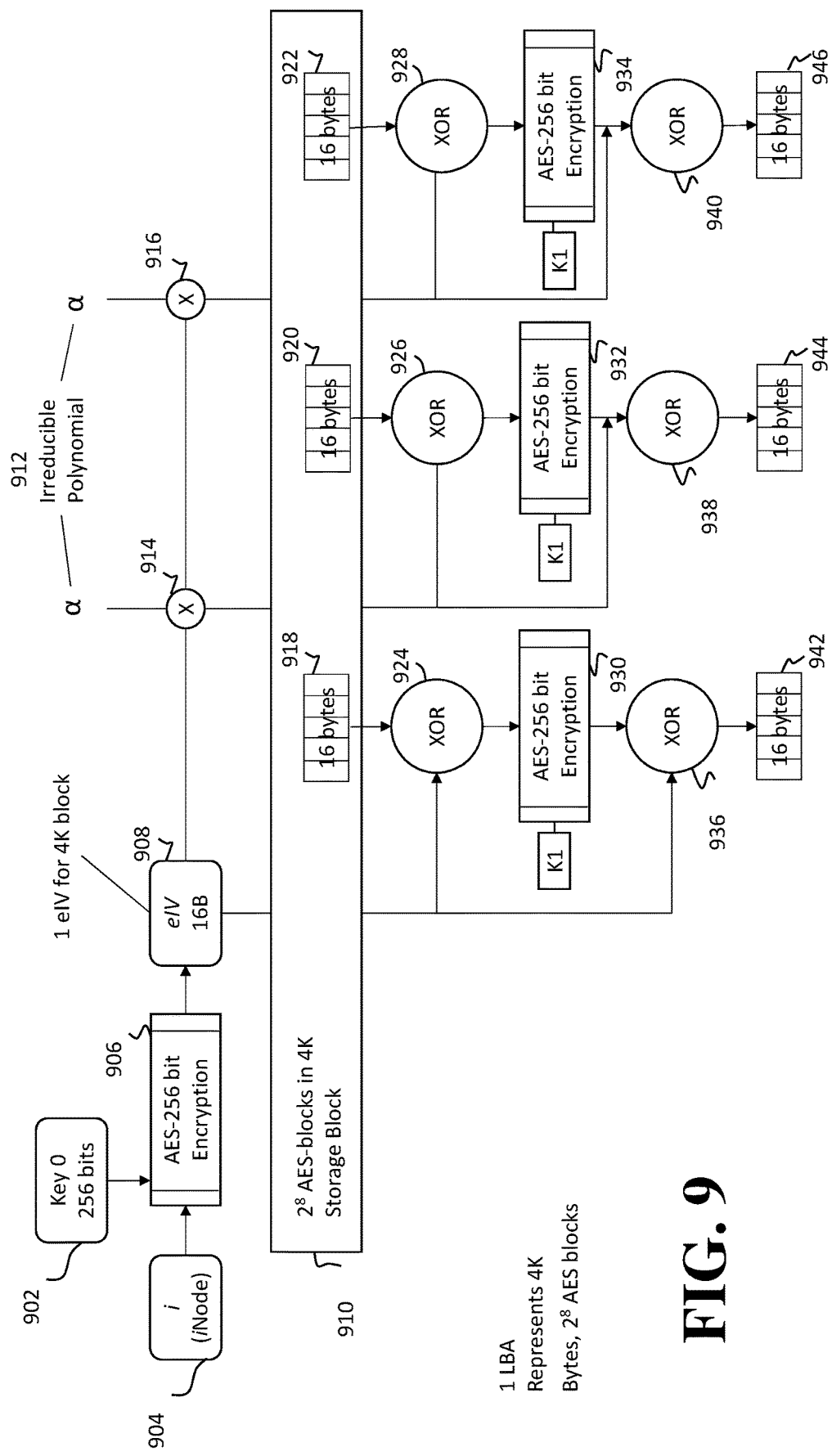
FIG. 9 shows an exemplary system for file encryption using inline cryptography according to one embodiment of the disclosure.

FIG. 9 shows an exemplary system for file encryption using inline cryptography according to one embodiment of the disclosure. The encryption mechanism of FIG. 9 may be implemented by the encryption/decryption engine 325 in FIGS. 3A, 3B or the AES Engine 814 of the examples in FIGS. 8A, 8B. As shown in FIG. 9, an exemplary storage block may be 4K in size. This is shown as storage blocks DS 918, DS 920, DS 922, DS 942, DS 944 and DS 946. A file will have many storage blocks. FIG. 9 is illustrated with AES-256 bit encryption. However, the disclosed principles may be applied to other encryption techniques without departing from the disclosed principles.

Input 904 to the encryption system of FIG. 9 may be an inode value 902. As discussed, inode value 902 may represent data structure associated with the file under encryption. A first Key (K0, 256 bit) 902 may be used to encrypt as illustrated at 906 to obtain tweak value eIV 908. The eIV 908 may comprise 16 bytes (1 eIV for 4K byte block of data). The eIV 908 may be combined by an irreducible polynomial to obtain other 912 to subsequent eIV inputs. In an exemplary embodiment, the irreducible polynomial may be determined based on the standard defined in the IEEE § 1619 (Standard Architecture for Encrypted Shared Storage Media). Alpha is define in IEEE § 1619 standard.

According to one exemplary embodiment, each storage block 910 may use the iNode or {iNode||Storage Block Number}, where the storage block number is the storage block number in the file. For example, if a file has 4 blocks of 4K bytes each (16K byte file), the file data is stored in block numbers from 0-3. For every storage block storing file data, there can be $2^8+1$ encryptions done, or 1 per AES block +1. In one implementation, the +1 encryption is done at the beginning of each block (as shown in FIG. 9) to generate the eIV.

For every 16 bytes (AES blocks 918, 920 and 922), in the storage block 910, the eIV is multiplied with $\alpha^{aes\_block\_id}$. Thus, if a storage block has 4K byte AES blocks, it will have $2^8$ AES blocks (910), there will be one eIV generated for the $2^8$ AES blocks and for every AES block, the eIV will get multiplied with $\alpha^{aes\_block\_id}$ and the resulting tweak is XORed (924, 926, 928) with the plaintext (918, 920, 922) and XORed (936, 938, 940) with the cipher text (obtained from 930, 932, 934). For each block 910, FIG. 9 also shows AES-256 bit encryption with K1 (fist Key) in 930, 932 and 934.

Once the above process is repeated for all the storage blocks in the file, the encryption mechanism of FIG. 9 provides an encrypted file consisting of ciphertext of all the blocks. In one embodiment, the LBA(s) where the file is actually written does not change nor does the size of the file. The result is shown as encrypted data blocks 942, 944 and 946.

The difference between using only iNode versus iNode||Storage Block Number is to make the encryption mechanism sturdier against known plaintext attacks within the file scope. For example, if the Block Count is not used for the generation of the tweak value eIV, then same plaintext in two different blocks within the same file may lead to same ciphertext which can be vulnerable to known ciphertext attacks. Once the block count of the file is used, the known ciphertext attack are reduced to finding two known ciphertexts within the same block and same alignment which is a much harder exercise.

It should be noted that although iNode is an EXT filesystem concept, all file systems have file metadata structures similar to iNodes. The similar file structures may be used without departing from the disclosed principles.

The disclosed techniques may also be extended to all the files owned by a user or by a VM by using VM metadata or user metadata in the KLT for generation of the tweak. The KLT is directly mapped to physical address space so the VM may directly populate the KLT. This is also virtualizable since the hypervisor can divide the KLT into multiple 4K segments and assign it to each container or VM. There may be no need to change the key table.

It should be noted that although the exemplary embodiments are illustrated in relation to AES-XTS standard, different algorithms can be used according to the disclosed principles without departing therefrom.

PCIe Extensions

As discussed above, inline encryption implies that the encryption and decryption are occurring when the data is being read/written from the drive to DRAM or vice-versa. This is in contrast to lookaside encryption, where the NVMe controller writes data to memory and then some other agent reads plaintext data from memory, encrypts it and writes it back to memory or reads ciphertext from memory, decrypts it and writes plaintext to memory. As a result, the drive may not provide the information for encryption.

In order to handle this problem, a table-based approach may be used and allow the host software to setup the table, which the crypto controller can then look up. This option is feasible, however due to the need for fast lookups, it is impractical for the crypto controller to search the table or parse through a hierarchical table. There is a need for an index into the table and that index needs to be mapped with a transaction. This leads to the problem of sending the index in the transaction. That problem can be solved using unused address bits. However, there is also a need to solve this problem without using the address bits for platforms that need all their address bits, especially in the data centers of the cloud service providers that need to use all the address bits for addressing large amounts of data.

In order to solve the afore-mentioned problem, one embodiment allows the PCIe end point to have the choice of sending additional data in these headers, e.g., as discussed for example in connection with FIGS. 3A, 3B above. The PCIe header(s) can be used to send the key table index into the KLT and the offset value. The crypto controller parses and removes this header information and uses the key table index field to look up a record/entry in a table and the offset field to calculate the actual LBA from the base LBA. This allows various embodiments to support indexes for 64K pending entries (using 16 bits) and offsets of 20 bits (i.e., 1M*4K) or 4 Gigabytes of pending input/output (I/O or IO) transactions in one embodiment. Depending on the implementation, the table/index size can be larger than this example.

Moreover, such embodiments can provide scalability since there is no need to reuse address bits. Also, there is no need to provide additional wires/pins in the system for increasing the address bits, which would keep implementation costs and the required footprint down. Hence, some embodiments provide more flexibility by allowing modifications to send more bits depending on the implementation.

To this end, some embodiments relate to techniques of enforcing inline encryption on NVMe drives using one or more PCIe extension(s). In an embodiment, an index to a key table is provided to the NVMe drive from the host (e.g., host software 304) and the NVMe drive then communicates the key table index of the key to be used for encryption/decryption in a DMA (or other memory access like a PCIe) request along with an offset value, e.g., in the PCIe TLP (Transaction Layer Packet) prefix.

Figure 10:
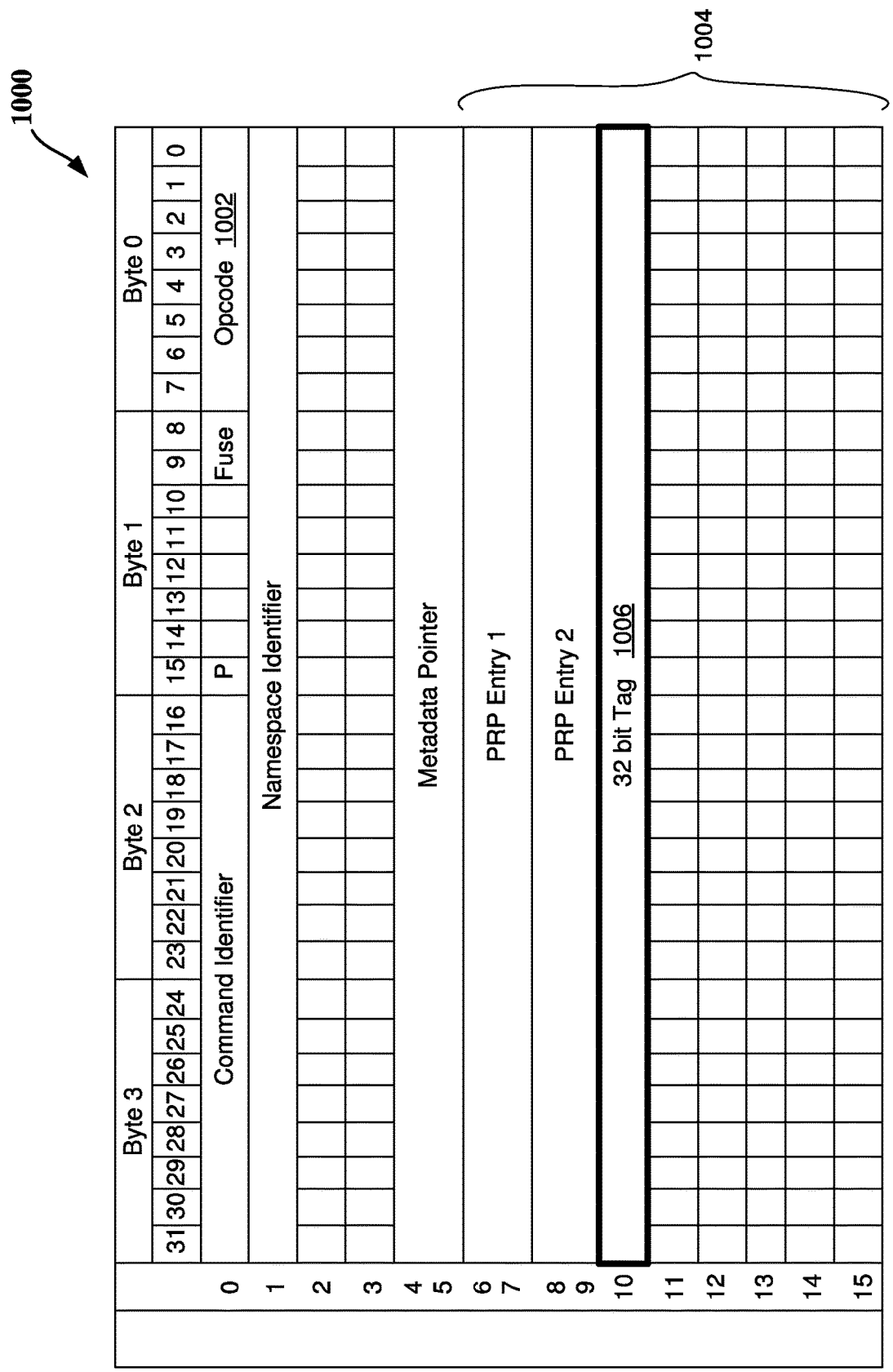
FIG. 10 shows sample information for a NVMe (NVM express) command associated with a read operation or a write operation, which may be used in one or more embodiments.

Generally, NVMe commands contain command codes and parameters. FIG. 10 shows sample information for a NVMe command associated with a read operation or a write operation, which may be used in one or more embodiments. The OpCode or Operational Code 1002 indicates whether the command is a read or a write command, while the PRP (Physical Region Page) entries (or pages) 1004 point to the actual data. As shown, 32 bits can be reserved in the NVMe command for a 32-bit tag (maximum in an embodiment) that is sent by the software along with the command. Software 340 populates a 32-bit index (and any other information if needed) in the tag 1006 and the rest of the command stays the same. While some embodiments herein are discussed with reference to a 32-bit tag, other size tags may also be used depending on system capabilities.

Figure 11:
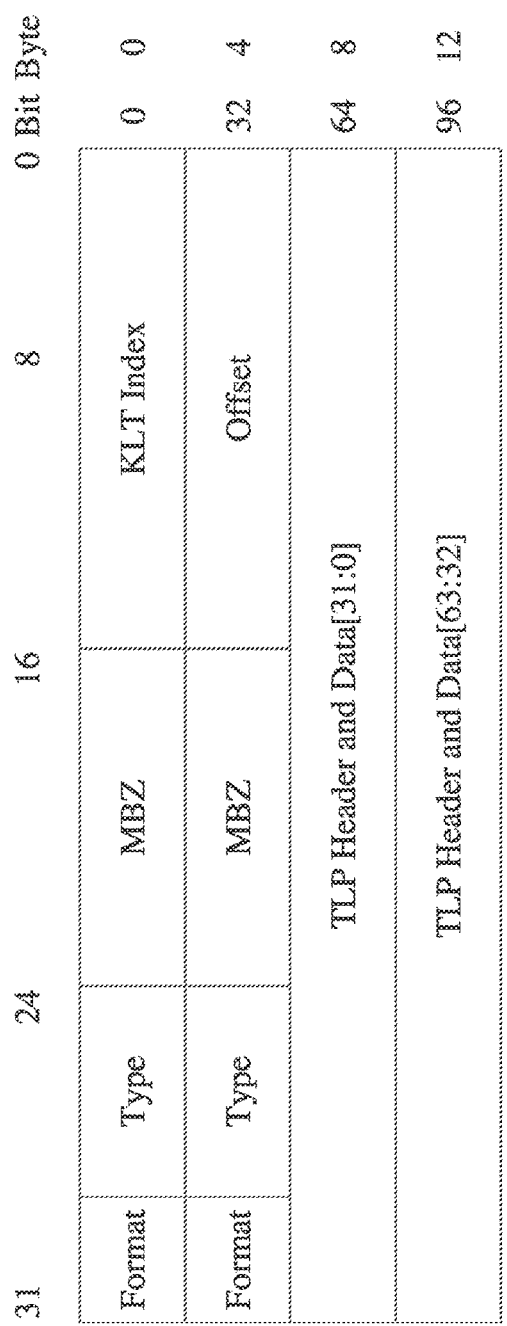
FIG. 11 illustrates a sample PCIe TLP (Transaction Layer Packet), according to an embodiment.

FIG. 11 illustrates a sample PCIe TLP (Transaction Layer Packet) 1100, according to an embodiment. As shown, the TLP 1100 may include various fields. FIG. 12 illustrates information 1200 regarding various fields of the TLP 1100 of FIG. 11, according to an embodiment.

Referring to FIGS. 11 and 12, once the NVMe drive (e.g., the controller 304 of the NVMe drive 302) receives the 32-bit tag, it takes the first 16 bits and puts them in the KLT index field in the TLP prefix. Thereafter, for every LBA, there is a unique 4K page in the PRP or the PRP list. Depending on the sequence of the LBA from (or following) the first LBA in the command, the drive writes an index of the LBA in the offset field of the TLP prefix. This completes the TLP prefix and now the NVMe drive can send the PCIe request with the TLP prefix to the SOC. The SOC receives this TLP prefix and routes it to the crypto controller. The crypto controller extracts the data out of the TLP prefix, reads the information, adds the offset to the index, and encrypts or decrypts the data based on whether it is a write operation or a read operation, respectively, e.g., as outlined for example in connection with FIGS. 3A, 3B, FIGS. 8A, 8B, and FIG. 9.

In at least one embodiment, the NVMe drive can send other metadata also in the TLP prefix. For example, it could send block metadata in the prefix. The block metadata may include some file information that enables the host to determine which entities are allowed to access the block metadata. $E_0$ $E_1$ $E_2$ $E_3$ correspond to the header type that is used to identify the TLP extension containing the index and/or offset. This might be a proprietary number, and may be centrally (e.g., uniquely) assigned (e.g., by the PCIe standard group or system designer/builder) so that there are no potential conflicts.

Enabling Integrity Protected Block Storage on NVME Drives

Generally, NVMe (Non-Volatile Memory express) devices store data at rest (i.e., persistently) and this data has to be encrypted and optionally integrity protected for security. Also, while some embodiments herein are discussed with reference to an NVMe drives, embodiments are not limited to NVMe devices and other types of non-volatile memory may be used, such as a Dynamic Random Access Memory (DRAM) with battery backup.

One way to protect data at rest is using AES-XTS or Advanced Encryption Standard (AES) XEX-based Tweakable-codebook mode with ciphertext Stealing (XTS) that only provides confidentiality of data (e.g., via encryption). With confidentiality protection, a physically present adversary cannot readily read the plaintext (where "plaintext" refers to non-encrypted text). This protection has been sufficient for the industry for a long time. The next frontier of this protection is the integrity of data (in addition to confidentiality). Since the data in the drive is saved at a block granularity (both in file encryption and volume encryption scenario), there is an opportunity to protect integrity of the data at a block granularity, in addition to confidentiality of data. As discussed herein, integrity enforcement detects modification of encrypted data, while confidentiality prevents decryption of encrypted data. For example, if we have a string "foo" and it is encrypted to "bar" using a one way function F( ), confidentiality will ensure that the person who knows "bar" will not be able to derive "foo" from it without knowing the key. Integrity will ensure that if somebody changes the word "bar" to "bat" and then tries to decrypt it using F'( ), F'( ) will throw an error showing that the ciphertext has been modified.

Providing integrity of data has two fundamental challenges. Firstly, integrity needs a MAC (Message Authentication Code) and the computation of a MAC consumes extra compute cycles, and secondly this MAC has to be stored along with the data. This needs extra storage space besides the data block.

To this end, some embodiments provide techniques for efficient enabling of integrity protected block storage on NVME (Non-Volatile Memory express) drives. An embodiment uses an inline encryption mechanism and enables logic/software to select which blocks are secured with integrity protection vs. which blocks are secured with confidentiality only. As discussed herein, inline encryption implies that the encryption and decryption are happening when the data is being read/written from the drive to DRAM or vice-versa. This is in contrast to lookaside encryption, where the NVMe controller writes data to memory and then some other agent reads plaintext data from memory, encrypts it and writes it back to memory or reads ciphertext from memory, decrypts it and writes plaintext to memory. For example, software/logic may use one or more bits in the command structure to indicate enforcement of integrity protection for a block. In order to provide integrity protection, an inline encryption engine can be modified in one embodiment to provide AES Galois/Counter Mode (GCM) (or AES-GCM) in addition to AES-XTS. As an example, a bit in the command stream may indicate whether one or more blocks associated with a command should be integrity protected or encrypted only for confidentiality.

In one embodiment, the MAC is calculated inline along with the encryption and AES-GCM is used for performing the encryption and calculating the MAC. The MAC is transferred to the NVMe drive (e.g., on write operation(s) to the drive) and read from the drive (e.g., on read operation(s) from drive). In an embodiment, the MAC will be included with the original data and no separate read/write operation is necessary to transfer the MAC. NVMe drives already support eight bytes of metadata per block. This allows some embodiments to support 64 bits of MAC for a 4K Byte block size, e.g., at about 0.1% overhead. The NVMe command can then use a metadata pointer to read the metadata along with the rest of the data. One advantage of such an implementation is that there is no need to convert a single read into multiple reads, thereby not impacting throughput.

Moreover, one embodiment provides an inline encryption mechanism that supports AES-GCM in addition to AES-XTS. An integrity TAG is generated using AES-GCM inline (i.e., without additional computation overheads) and the generated tag is then stored in the metadata fields of an NVMe drive. At least one embodiment provides a mechanism for logic/software to decide which blocks should have only confidentiality and which blocks should have integrity too. Hence, one or more embodiments can provide integrity for data and protect the data from more advanced threats (more active threats). Also, data protection may be provided against flash corruption or corruption in the transport channel from the NVMe storage to main memory or DRAM.

Figure 13:
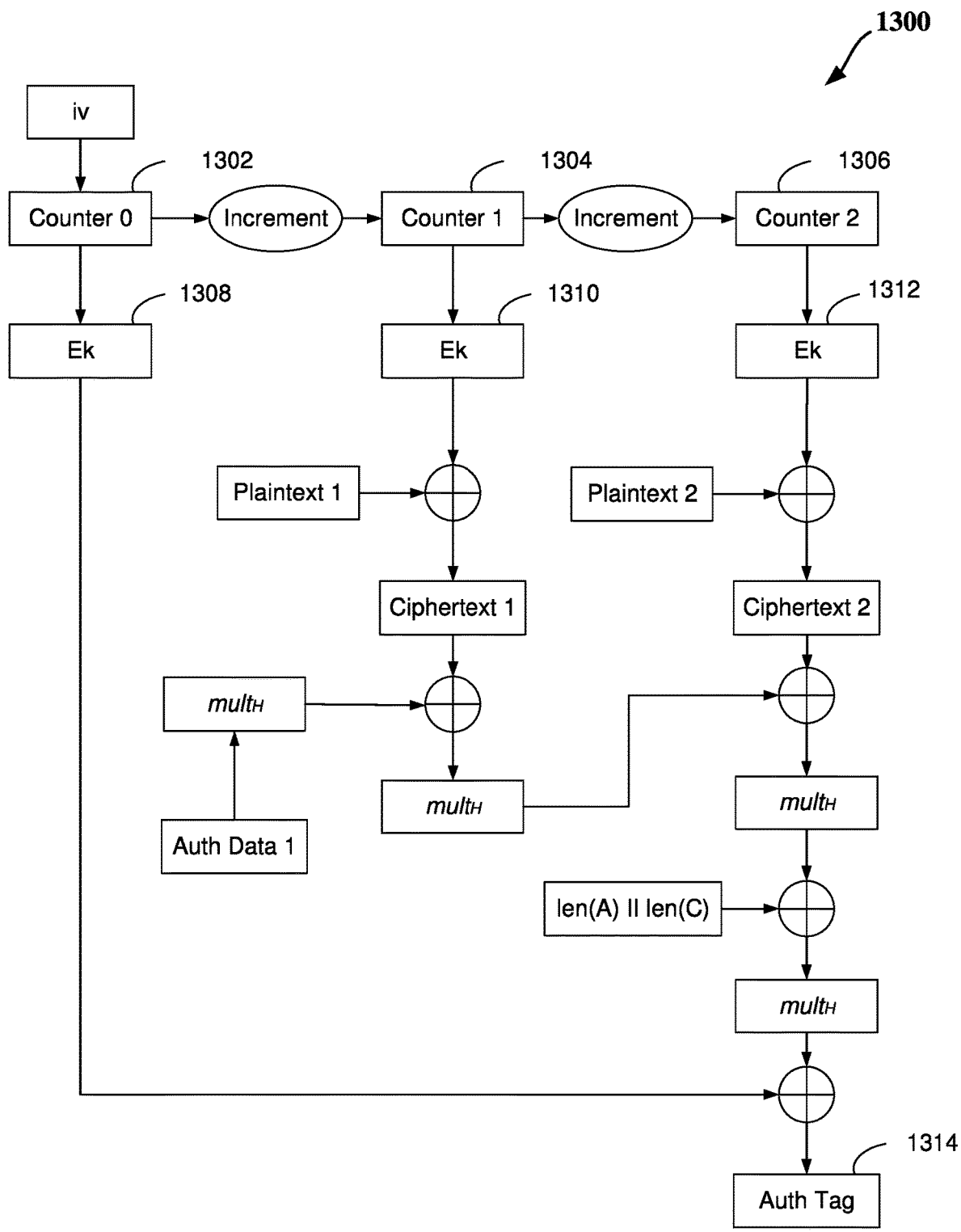
FIG. 13 is a flow diagram of AES-GCM operations, which may be applied in one or more embodiments.

FIG. 13 is a flow diagram of AES-GCM operations, which may be applied in one or more embodiments. The fields referred to in FIG. 13 include:

| | |
|---|---|
| IV (input) | Logical Block Address or LBA |
| Counter (internal) | $0 \rightarrow 2^8$ entries (4K Byte storage block size, 16-Byte AES block size) |
| Auth Tag (output) | Truncated to 64-bit tag (truncation is not shown in FIG. 13) |
| Auth Data (input) | Software/logic chosen (e.g., File Identifier), taken from LBA/File Info field in the table |
| Cipher Text (generated) | output |

The table above shows examples for a 4 kB block size; however, embodiments are not limited to 4 KB block size and smaller or larger block sizes may be used depending on the implementation. Also, a 64-bit tag is just for illustrative purposes and larger/smaller tags may be used.

Referring to FIG. 13, input LBA (iv) is used to generate three counters 1302, 1304, and 1306 (where the output of counters 1302 and 1304 are incremented prior to be fed to the next counter as shown). Outputs from the counters are then respectively fed to AES block cipher $E_k$'s 1308, 1310, and 1312 (AES), where $E_k$ denotes Encryption with key K (e.g., AES 256 bit encryption with key K). While the output of 1308 is provided to the last stage as Auth Tag 1314, the results of encryption by 1310 and 1312 are used to generate ciphertext outputs based on xoring with plaintext inputs. These operations are similar to a stream cipher, and hence different iv can be used for each stream that is encrypted. The ciphertext blocks are considered coefficients of a polynomial which is evaluated at a key-dependent point H, using finite field arithmetic. The Auth Data 1 is then fed through stages of $\text{mult}_H$ (or Galois Field multiplication) based on Ciphertext 1 and Ciphertext 2 in combination with len(A) and len(C) to provide the Auth Tag 1314, where len (A) is the length of plaintext and len(C) is the length of ciphertext.

Figure 14:
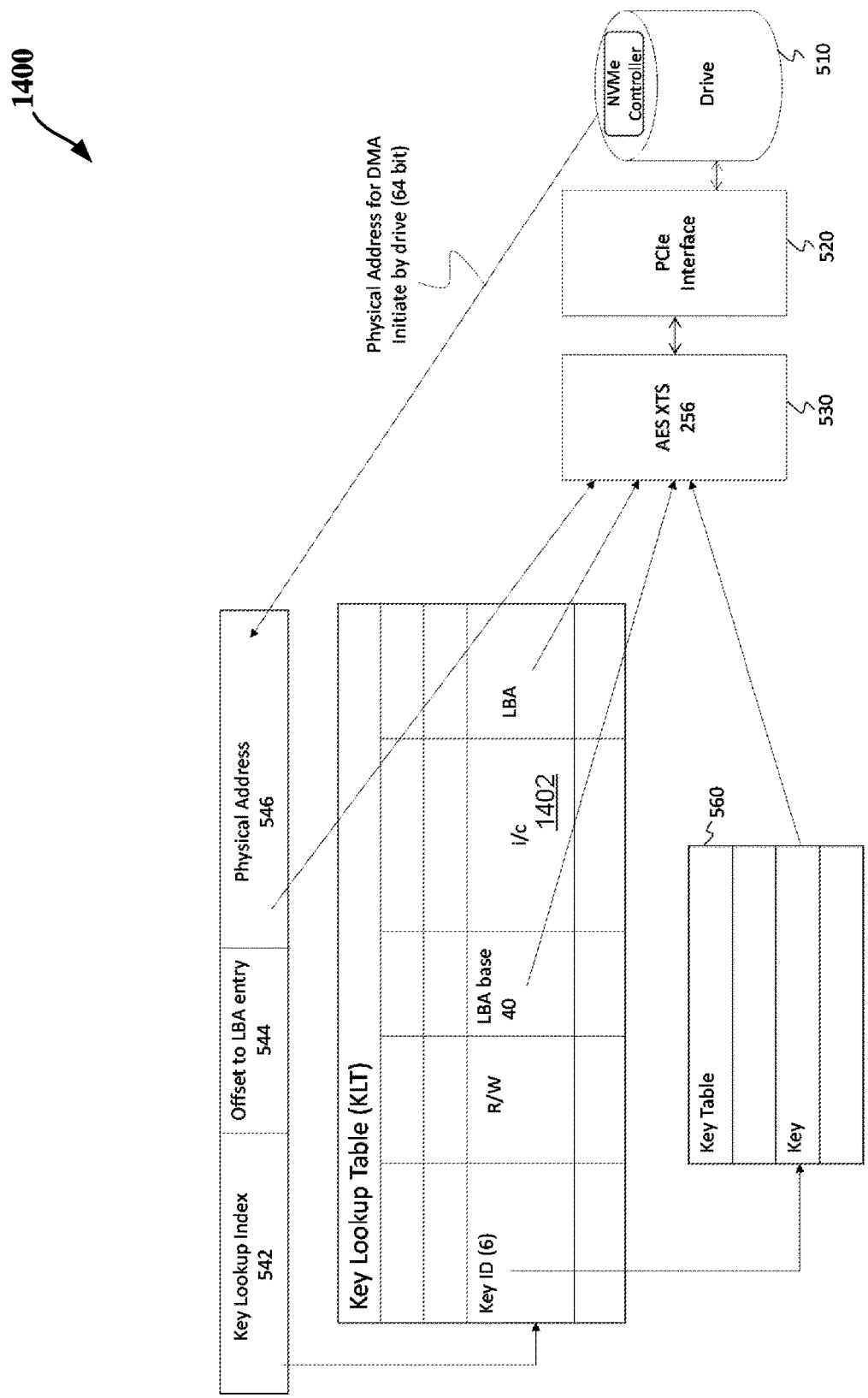
FIG. 14 illustrates an extended encryption table, according to an embodiment.

FIG. 14 illustrates an extended encryption table 1400, according to an embodiment. Various components shown in FIG. 14 were previously discussed with reference to FIGS. 5 and/or 7, as indicated by the reference numerals. Encryption table 1400 extends the inline encryption table KLT discussed above to indicate the blocks that need to be encrypted vs. integrity protected. The I/C field 1402 enables the logic/software (e.g., crypto controller 322) to decide if a transaction needs to be integrity protected. Also, the inline encryption engine discussed above can be extended to support AES-GCM.

Figure 15:
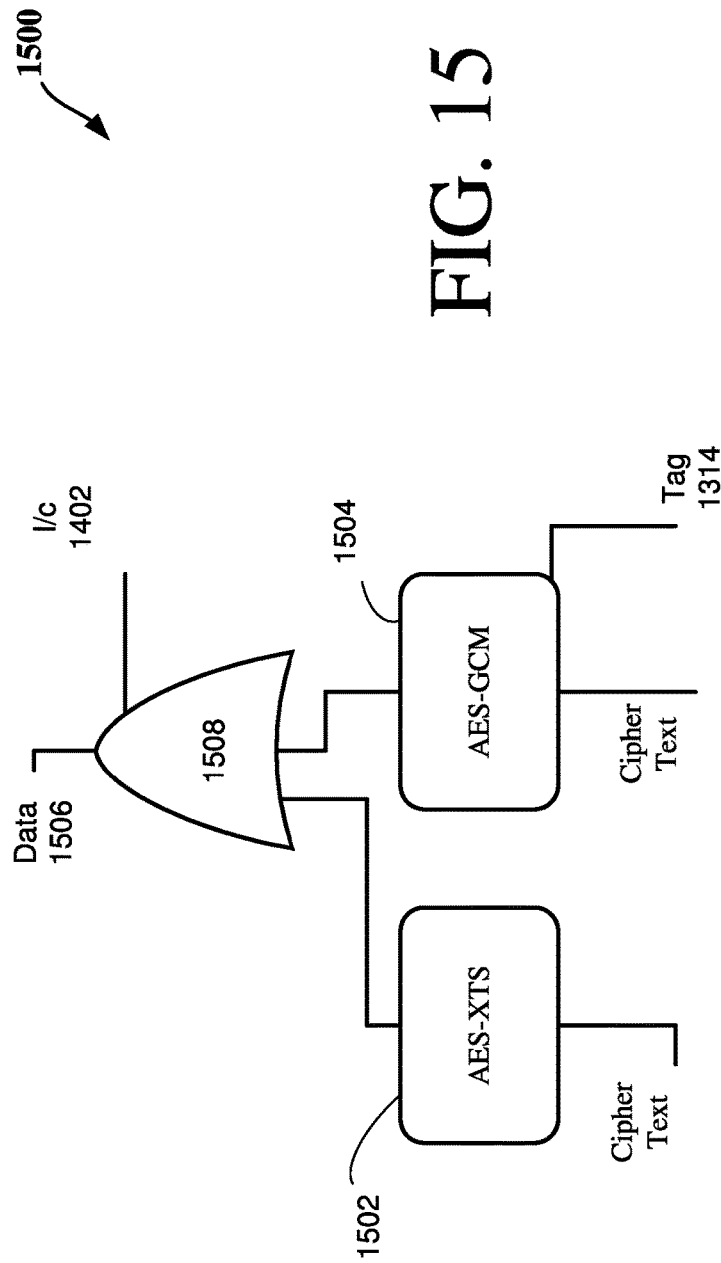
FIG. 15 shows a circuit diagram of a coarse-grained separation between an AES-XTS engine and an AES-GCM engine, according to an embodiment.

For example, FIG. 15 shows a circuit diagram 1500 of a coarse-grained separation between an AES-XTS engine and an AES-GCM engine, according to an embodiment. In one embodiment, the AES engine may be reused across both the XTS and GCM engines, while the tag generation is separated from the tweak generation. The AES engine(s) may be duplicated for increased throughput in one or more embodiments.

Referring to FIG. 15, the AES engines 1502 and 1504 generate and output ciphertext and tag 1314 based on input data 1506 after selection logic 1508 selects between the AES-XTS engine 1502 or AES-GCM engine 1504 based on the value of c/I 1402. As shown in FIG. 15, AES-GCM engine outputs the tag (e.g., Auth Tag 1314 of FIG. 1314).

Figure 16:
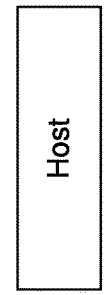
FIG. 16 illustrates a transfer format of a buffer, according to an embodiment.

FIG. 16 illustrates a transfer format of a buffer 1600, according to an embodiment. More specifically, FIG. 16 shows how data and/or metadata can be stored and transferred using a single buffer 1600. As shown, the data blocks can be interleaved by metadata blocks. In an embodiment, the value returned by the Auth Tag in FIG. 15 is truncated to 64 bits and stored in the block metadata of FIG. 16. In various embodiments, the buffer 1600 may be implemented in several locations in the systems of FIG. 2, 3A, or 3B, such as within the SOC 320, crypto controller 322, encryption/decryption engine 325, etc., or be otherwise accessible by the SOC 320, crypto controller 322, encryption/decryption engine 325.

The following examples pertain to further embodiments. Example 1 includes a System-on-Chip (SOC) to communicate with a Non-Volatile Memory NVMe circuitry to provide direct memory access (DMA) to an external memory component, the SOC comprising: a cryptographic controller circuitry; a cryptographic memory circuitry in communication with the cryptographic controller, the cryptographic memory circuitry configured to store instructions to encrypt or decrypt data transmitted through the SOC; and an encryption engine in communication with the crypto controller circuitry, the encryption engine configured to encrypt or decrypt data according to instructions stored at the crypto memory circuitry; wherein the cryptographic controller one of encrypts or decrypts data in a data packet in transition between the NVMe and the external memory component as a function of one or more of a physical address bit, a key lookup table and a key table. Example 2 includes the SOC of example 1, wherein the SOC provides direct memory access (DMA) with inline encryption to NVMe substantially at line speed. Example 3 includes the SOC of example 1 or 2, wherein the external memory component comprises a dynamic random access memory (DRAM) module. Example 4 includes the SOC of one of examples 1-3, wherein the NVMe further comprises a static access memory (SRAM) module. Example 5 includes the SOC of one of examples 1-4, wherein the cryptographic controller one of encrypts or decrypts the data in the data packet as a function of one or more of Index bits of the data packet, Logical Block Address (LBA) Offset of the data in the data packet, physical address associated with the data in the data packet and LBA and/or file information. Example 6 includes the SOC of one of examples 1-5, wherein the cryptographic controller forms a 256 bit key for the data packet as a function of whether the data packet is a Read or a Write packet, LBA and the Key Index Bit associated with the data packet. Example 7 includes the SOC of one of examples 1-6, wherein the cryptographic controller provides inline file-level encryption at line speed. Example 8 includes the SOC of one of examples 1-7, wherein the cryptographic controller is configured to perform the operations of one of examples 1-7.

Example 9 includes a non-transient machine readable medium including instructions to one of encrypt or decrypt data in a data packet transmitted as direct memory access (DMA) between a Non-Volatile Memory (NVMe) circuitry and an external memory component, which when executed on a cryptographic controller circuitry causes the a cryptographic controller to implement operations comprising: extract a bit index, Logical Block Address (LBA) and the Key Id values associated with the data packet; determine the base address value and the key offset value for the data in the data packet; determine Keys and the Key attributes for the data packet; construct a Final LBA value by adding the key offset value in the address bit to the base address; and encrypt or decrypt the data in the data packets as a function of the Final Logical Block Address (LBA) value. Example 10 includes the medium of example 9, wherein the instructions are executed in real-time and substantially at line speed. Example 11 includes the medium of one of examples 9 or 10, wherein line speed defines the fastest communication speed between the NVMe and the cryptographic controller circuitry. Example 12 includes the medium of one of examples 9-11, wherein the NVMe further comprises a static access memory (SRAM) module. Example 13 includes the medium of one of examples 9-12, wherein the external memory component comprises a dynamic random access memory (DRAM). Example 14 includes the medium of one of examples 9-13, wherein the data packet includes bit index value, logical block address and the Key Id values.

Example 15 includes a System-On-Chip (SOC) to communicate with a Non-Volatile Memory NVMe Drive to provide direct memory access (DMA) to an external Memory component, the SOC comprising: a cryptographic controller circuitry to communicate data with the NVMe Drive and the external Memory Component; an encryption/decryption engine to at least one of encrypt or decrypt data; and an SOC memory to communicate with the cryptographic controller, the SOC memory further comprising a Key Lookup Table (KLT) and a Key Table (KT); wherein the cryptographic controller circuitry is configured to: obtain n Key Indexes and n Tweak data from the KLT; obtain a corresponding n Keys from the KT, each of the n Keys corresponding to one of the n Key Indexes; expand each of the n Keys; Generate n Tweaks corresponding to each of the n Tweak Data; implement one or more rounds of encryption for each of the n Keys to generate n encrypted data sets; and apply the n Tweaks to a corresponding one n encrypted data sets. Example 16 includes the SOC of example 15, wherein the encryption/decryption engine comprises an AES encryption engine. Example 17 includes the SOC of example 15 or 16, wherein n is an integer equal or greater than 2, Example 18 includes the SOC of one of examples 15-17, wherein the instructions are executed in real-time and substantially at line speed. Example 19 includes the SOC of one of example 15-18, wherein line speed defines the fastest communication speed between the NVMe and the external Memory component. Example 20 includes the SOC of one of examples 15-19, wherein the NVMe further comprises a static access memory (SRAM) module. Example 21 includes the SOC of one of examples 15-20, wherein the external memory component comprises a dynamic random access memory (DRAM). Example 22 includes the SOC of one of examples 15-21, wherein the one or more rounds of encryption comprises 14 rounds.

Example 23 includes a non-transient machine readable medium including instructions to one of encrypt or decrypt data in a data packet transmitted as direct memory access (DMA) between a Non-Volatile Memory (NVMe) circuitry and an external memory component, which when executed on a cryptographic controller circuitry causes the a cryptographic controller to implement operations comprising: obtain a first and second Key Indexes (K1, K2) and obtain a first and second Tweak Data (Tweak T1, Tweak T2); obtain corresponding Keys for each of the obtained Key Indexes; expand each of K1 and K2; expand Key Generate Tweak 1 based on Tweak Data 1, T1; expand Key Generate Tweak 2 based on Tweak Data 2, T2; implement one or more rounds of encryptions of the data in the data packet to form an encrypted data with K1 and apply Tweak T1 to the encrypted data; implement one or more rounds of encryption of the encrypted data to which Tweak T1 has been applied with K2 and apply Tweak T2. Example 24 includes the medium of example 23, wherein the encryption/decryption engine comprises an AES encryption engine. Example 25 includes the medium of example 23 or 24, wherein n is an integer equal or greater than 2. Example 26 includes the medium of one of examples 23-25, wherein the instructions are executed in real-time and substantially at line speed. Example 27 includes the medium of one of examples 23-26, wherein line speed defines the fastest communication speed between the NVMe and the external Memory component. Example 28 includes the medium of one of examples 23-27, wherein the NVMe further comprises a static access memory (SRAM) module. Example 29 includes the medium of one of examples 23-28, wherein the external memory component comprises a dynamic random access memory (DRAM). Example 30 includes the medium of one of examples 23-29, wherein the one or more rounds of encryption comprises 14 rounds. Example 31 includes the medium of one of examples 23-30, wherein the one or more rounds of encryption comprises 14 rounds. Example 32 includes the medium of one of examples 23-31, wherein the instructions provide a Key for each 4K bite block of data. Example 33 includes the medium of one of examples 23-32, wherein the instructions provide double encryption.

Example 34 includes an apparatus to generate an encryption tweak, the apparatus comprising: a memory to store information including a cryptographic key; a processor circuitry to communicate with the memory; the processor circuitry to receive a file extension value (iNode) from a file to be encrypted and the cryptographic key from the memory to generate a cryptographic tweak (eIV) nonce for a block of data associate with the file. Example 35 includes the apparatus of example 34, wherein the file extension value comprises an iNode value associated with the file. Example 36 includes the apparatus of one of examples 34 or 35, wherein the file extension value comprises an iNode value associated with the file and the block count of the data associated with the file. Example 37 includes the apparatus of one of examples 34-36, wherein the memory further stores instructions to implement encryption according to AES-NI standard. Example 38 includes the apparatus of one of examples 34-37, wherein the processor circuitry executes 28+1 encryption cycles for each block of data. Example 39 includes the apparatus of one of examples 34-38, wherein the block is about 16 bytes in size.

Example 40 includes a non-transient machine readable medium including instructions to one of encrypt or decrypt data in a data packet transmitted as direct memory access (DMA) between a Non-Volatile Memory (NVMe) circuitry and an external memory component, which when executed on a cryptographic controller circuitry causes the a cryptographic controller to implement operations comprising: receive a file extension value (iNode) from a file to be encrypted; receive the cryptographic key from the memory; and generate a cryptographic tweak (eIV) nonce for a block of data associate with the file. Example 41 includes the medium of example 40, wherein the file extension value comprises an iNode value associated with the file. Example 42 includes the medium of one of examples 40 or 41, wherein the file extension value comprises an iNode value associated with the file and the block count of the data associated with the file. Example 43 includes the medium of one of examples 40-42, wherein the medium further stores instructions to implement encryption according to AES-NI standard. Example 44 includes the medium of one of examples 40-43, wherein the processor circuitry executes 28+1 encryption cycles for each block of data. Example 45 includes the medium of one of examples 40-44, wherein the block is about 16 bytes in size.

Example 46 includes an apparatus comprising: a cryptographic controller circuitry to receive a Transaction Layer Packet (TLP) prefix, the cryptographic controller circuitry to extract a Key Lookup Table (KLT) index and an offset value, wherein the cryptographic controller circuitry is to cause encryption or decryption of data based at least in part on the extracted KLT index and the offset value. Example 47 includes the apparatus of example 46, wherein the cryptographic controller circuitry is to receive the TLP prefix from a drive. Example 48 includes the apparatus of example 46 or 47, wherein a host comprises the cryptographic controller. Example 49 includes the apparatus of any of examples 46 to 48, wherein the host is to receive the TLP prefix from a Non-Volatile Memory (NVM) drive. Example 50 includes the apparatus of any one of examples 46 to 49, wherein the host is to add a tag field into a command directed at a drive. Example 51 includes the apparatus of any one of examples 46 to 50, wherein the host is to receive the TLP prefix as part of a Peripheral Component Interface express (PCIe) request from a Non-Volatile Memory device. Example 52 includes the apparatus of any one of examples 46 to 51, wherein the NVM device is to extract the ALT index from a tag field of a command directed at the NVM device. Example 53 includes the apparatus of any one of examples 46 to 52, wherein the NVM device is to extract the KLT index from a tag field of a command directed at the NVM device, wherein the NVM device is to insert the KLT index into the TLP prefix. Example 54 includes the apparatus of any one of examples 46 to 53, wherein the NVM device is to insert the offset value into the TLP prefix. Example 55 includes the apparatus of any one of examples 46 to 54, wherein the NVM device is to determine the offset value based at least in part on a sequence of one or more logic block addresses from a first logic block address in a command directed at the NVM device. Example 56 includes the apparatus of any one of examples 46 to 55, wherein the NVM device comprises a Non-Volatile Memory express (NVMe) device. Example 57 includes the apparatus of any one of examples 46 to 56, wherein the cryptographic controller circuitry is to determine an actual Logical Block Address (LBA) for the data based on the offset value and a base LBA.

Example 58 includes an apparatus comprising: logic circuitry to cause a first set of data blocks to be encrypted for confidentiality protection and to cause a second set of data blocks to be encrypted for integrity protection, wherein the logic circuitry is to determine which blocks are to be encrypted for confidentiality versus integrity protection based on one or more bits in a command stream, wherein the first set of encrypted data blocks and the second set of encrypted data blocks are to be stored in a Non-Volatile Memo (NVM) drive. Example 59 includes the apparatus of example 58, wherein the first set of data blocks is to be encrypted for confidentiality based on an Advanced Encryption Standard (AES)-XEX Tweakable block cipher with Ciphertext Stealing (XTS). Example 60 includes the apparatus of example 58 or 59, wherein the second set of data blocks is to be encrypted for confidentiality based on an Advanced Encryption Standard (AES)-Galois/Counter Mode (GCM). Example 61 includes the apparatus of any one of examples 58 to 60, wherein a Message Authentication Code (MAC) is to be generated inline by the AES-GCM, wherein the MAC is to be transferred to the NVM drive on a write operation to the NVM drive and read from the NVM drive on a read operation from the NVM drive. Example 62 includes the apparatus of any one of examples 58 to 61, wherein an integrity tag is to be generated using the AES-GCM and stored in a metadata field of the NVM drive. Example 63 includes the apparatus of any one of examples 58 to 62, wherein integrity protection is to prevent modification to a ciphertext. Example 64 includes the apparatus of any one of examples 58 to 63, wherein the command stream is to be directed at the NVM drive. Example 65 includes the apparatus of any one of examples 58 to 64, wherein the first set of data blocks or the second set of data blocks are to be encrypted inline as data is being read or written. Example 66 includes the apparatus of any one of examples 58 to 65, wherein the NVM drive comprises a Non-Volatile Memory express (NVMe) drive.

Example 67 includes an apparatus comprising means to perform an operation as set forth in any one of examples 1 to 66. Example 68 includes a computer-readable medium comprising one or more instructions that when executed on a processor configure the processor to perform one or more operations of any one of examples 1 to 8, 15 to 22, 34 to 38, and 46 to 66. Example 69 includes an apparatus comprising means to perform a method as set forth in any preceding example. Example 70 includes machine-readable storage including machine-readable instructions, when executed, to implement a method or realize an apparatus as set forth in any preceding example.

In various embodiments, the operations discussed herein, e.g., with reference to FIG. 1 et seq., may be implemented as hardware (e.g., logic circuitry or more generally circuitry or circuit), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to FIG. 1 et seq.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

While the principles of the disclosure have been illustrated in relation to the exemplary embodiments shown herein, the principles of the disclosure are not limited thereto and include any modification, variation or permutation thereof.

The invention claimed is:

1. A System-on-Chip (SOC) to communicate with a Non-Volatile Memory (NVMe) to provide direct memory access (DMA) to an external memory component, the SOC comprising:
   a cryptographic controller circuitry;
   a cryptographic memory circuitry in communication with the cryptographic controller circuitry, the cryptographic memory circuitry configured to store instructions to encrypt or decrypt data transmitted through the SOC; and
   an encryption engine in communication with the cryptographic controller circuitry, the encryption engine configured to encrypt or decrypt data according to instructions stored at the cryptographic memory circuitry;
   wherein the cryptographic controller circuitry one of encrypts or decrypts data in a data packet in transition between the NVMe and the external memory component as a function of one or more of a physical address bit, a key lookup table and a key table, wherein the cryptographic controller circuitry at least one of encrypts or decrypts the data in the data packet as a function of: a physical address associated with the data in the data packet and a Logical Block Address (LBA), file information, and one or more of Index bits of the data packet.

2. The SOC of claim 1, wherein the SOC provides direct memory access (DMA) with inline encryption to the NVMe at line speed.

3. The SOC of claim 1, wherein the external memory component comprises a dynamic random access memory (DRAM) module.

4. The SOC of claim 1, wherein the NVMe comprises a static access memory (SRAM) module.

5. The SOC of claim 1, wherein the cryptographic controller circuitry at least one of encrypts or decrypts the data in the data packet as a further function of a Logical Block Address (LBA) Offset of the data in the data packet.

6. The SOC of claim 1, wherein the cryptographic controller circuitry forms a 256 bit key for the data packet as a function of whether the data packet is a Read or a Write packet, an LBA and the Key Index Bit associated with the data packet.

7. The SOC of claim 1, wherein the cryptographic controller circuitry provides inline file-level encryption at line speed.

8. A non-transient machine readable medium including instructions to one of encrypt or decrypt data in a data packet transmitted as direct memory access (DMA) between a Non-Volatile Memory (NVMe) circuitry and an external memory component, which when executed on a cryptographic controller circuitry causes the cryptographic controller circuitry to implement operations comprising:
   extract a bit index, a Logical Block Address (LBA) and the Key Id values associated with the data packet;
   determine the base address value and the key offset value for the data in the data packet;
   determine Keys and the Key attributes for the data packet;
   construct a Final LBA value by adding the key offset value in the address bit to the base address; and
   encrypt or decrypt the data in the data packets as a function of the Final Logical Block Address (LBA) value, wherein the data in the data packet is to be at least one of encrypted or decrypted as a function of: a physical address associated with the data in the data packet and the LBA, file information, and one or more of Index bits of the data packet.

9. The medium of claim 8, wherein the instructions are executed in real-time and at line speed.

10. The medium of claim 9, wherein the line speed defines the fastest communication speed between the NVMe and the cryptographic controller circuitry.

11. The medium of claim 8, wherein the NVMe further comprises a static access memory (SRAM) module.

12. The medium of claim 8, wherein the external memory component comprises a dynamic random access memory (DRAM).

13. The medium of claim 8, wherein the data packet includes bit index value, logical block address and the Key Id values.

14. A method comprising:
   extracting a bit index, Logical Block Address (LBA) and Key Id values associated with a data packet, wherein the data packet is transmitted as direct memory access (DMA) between a Non-Volatile Memory (NVMe) and an external memory component;

determining a base address value and a key offset value for data in the data packet;

determining Keys and Key attributes for the data packet;

constructing a Final LBA value by adding the key offset value in an address bit to the base address; and encrypting or decrypting the data in the data packets as a function of: a physical address associated with the data in the data packet and an LBA, file information, and one or more of Index bits of the data packet.

15. The method of claim 14, wherein the data packet is processed at line speed.

16. The method of claim 15, wherein the line speed defines the fastest communication speed between the NVMe and a cryptographic controller circuitry.

17. The method of claim 14, wherein the NVMe comprises a static access memory (SRAM) module.

18. The method of claim 14, wherein the external memory component comprises a dynamic random access memory (DRAM).

19. The method of claim 14, wherein the data packet includes the bit index, the logical block address and the Key Id values.

20. The method of claim 14, wherein the encrypting or decrypting of the data in the data packets is to be further performed as a function of the Final LBA value in addition to the physical address associated with the data in the data packet and the LBA, the file information, and the one or more of Index bits of the data packet.

* * * * *